United States Patent
Foland et al.

(10) Patent No.: US 12,413,083 B2
(45) Date of Patent: Sep. 9, 2025

(54) SYSTEMS AND METHODS FOR BIDIRECTIONAL CHARGING

(71) Applicant: BETA AIR, LLC, South Burlington, VT (US)

(72) Inventors: Steven J. Foland, South Burlington, VT (US); John Charles Palombini, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 18/510,330

(22) Filed: Nov. 15, 2023

(65) Prior Publication Data
US 2024/0305115 A1  Sep. 12, 2024

Related U.S. Application Data

(63) Continuation of application No. 18/120,039, filed on Mar. 10, 2023, now Pat. No. 11,855,469.

(51) Int. Cl.
*B60L 55/00* (2019.01)
*B64F 1/36* (2017.01)
(Continued)

(52) U.S. Cl.
CPC ............ *H02J 7/0042* (2013.01); *B64F 1/362* (2013.01); *H02J 7/0048* (2020.01); *B60L 53/66* (2019.02);
(Continued)

(58) Field of Classification Search
CPC ....... H02J 7/0042; H02J 7/0048; B64F 1/362; B60L 55/00; B60L 53/66; B60L 2240/545; B60L 2240/547; B64C 29/0008
(Continued)

(56) References Cited

U.S. PATENT DOCUMENTS

| 8,577,529 | B2 | 11/2013 | Takahashi et al. |
| 10,137,797 | B2 | 11/2018 | Deshpande |

(Continued)

FOREIGN PATENT DOCUMENTS

CN  102904311  1/2013

OTHER PUBLICATIONS

Matthieu Dubarry; Arnaud Devie; Katherine McKenzie, Durability and Reliability of Electric Vehicle Batteries under Electric Utility Grid Operations: Bidirectional Charging Impact Analysis, Aug. 1, 2017.

(Continued)

*Primary Examiner* — Nathaniel R Pelton
(74) *Attorney, Agent, or Firm* — Georgi Korobanov; Hoffman Warnick LLC

(57) ABSTRACT

Aspects relate to a system for discharging a power source of an electric aircraft. System may be configured to transfer power from the electric aircraft via a charging connection. In one or more embodiments, a charging station in electric communication with the power source may discharge the power source. For example, a controller communicatively connected to the electric aircraft may be configured to receive a supply request from a user and subsequently, generate a control signal that initiates a transfer of electrical power from the power supply to discharge the power source so that power data associated with the discharge may be collected and transmitted to the controller or a remote device of the user.

20 Claims, 12 Drawing Sheets

(51) Int. Cl.
*H02J 7/00* (2006.01)
*B60L 53/66* (2019.01)
*B64C 29/00* (2006.01)

(52) U.S. Cl.
CPC ........... *B60L 55/00* (2019.02); *B60L 2200/10* (2013.01); *B60L 2240/545* (2013.01); *B60L 2240/547* (2013.01); *B64C 29/0008* (2013.01)

(58) Field of Classification Search
USPC ........................................................ 320/109
See application file for complete search history.

(56) References Cited

U.S. PATENT DOCUMENTS

| | | | |
|---|---|---|---|
| 10,328,805 B1 | 6/2019 | Wyrobek et al. | |
| 10,604,027 B2 | 3/2020 | Dow et al. | |
| 10,693,294 B2 | 6/2020 | Kearns et al. | |
| 10,725,112 B1* | 7/2020 | Jung | G01R 31/3835 |
| 11,148,548 B2 | 10/2021 | Tseng | |
| 11,211,666 B2 | 12/2021 | Reeves | |
| 11,390,181 B1 | 7/2022 | Clark et al. | |
| 11,584,250 B1 | 2/2023 | Palombini | |
| 2017/0050529 A1 | 2/2017 | Lambert et al. | |
| 2019/0001834 A1 | 1/2019 | Suzuki | |
| 2020/0290472 A1* | 9/2020 | Heyne | G01R 31/374 |
| 2021/0358231 A1 | 11/2021 | Kazuno | |
| 2022/0281340 A1 | 9/2022 | Lu et al. | |
| 2022/0379768 A1 | 12/2022 | Hoki et al. | |
| 2023/0064812 A1* | 3/2023 | Dow | B60L 55/00 |
| 2023/0299604 A1* | 9/2023 | Muramatsu | H02J 7/0048 320/136 |
| 2023/0305587 A1* | 9/2023 | Thirumurthy | H02J 3/144 |
| 2024/0127644 A1* | 4/2024 | Apostolyuk | G07C 5/0825 |

OTHER PUBLICATIONS

Fazel Mohammadi; Gholam-Abbas Nazri; Mehrdad Saif, a Bidirectional Power Charging Control Strategy for Plug-in Hybrid Electric Vehicles, Aug. 9, 2019.

International Search Report and Written Opinion mailed May 16, 2024 for PCT/US2024/019024 filed Mar. 8, 2024; pp. 15.

* cited by examiner

SYSTEMS AND METHODS FOR BIDIRECTIONAL CHARGING

FIELD OF THE INVENTION

The present invention generally relates to the field of electric aircraft. In particular, the present invention is directed to systems and methods for bidirectional charging.

BACKGROUND

The burgeoning of electric vertical take-off and landing (eVTOL) aircraft technologies promises an unprecedented forward leap in energy efficiency, cost savings, and the potential of future autonomous and unmanned aircraft. However, the technology of eVTOL aircraft is still lacking in crucial areas of energy source solutions.

SUMMARY OF THE DISCLOSURE

In an aspect, a system for bidirectional charging, the system including an electric aircraft, the electric aircraft having a power source; and a controller communicatively connected to the electric aircraft, wherein the controller is configured to receive a supply request; and initiate a discharge of the power source using a charging station in electric communication with the electric aircraft via a charging connection, wherein the discharge comprises a current depth of discharge of the power source exceeding at least a predetermined discharge level; and obtain power data associated with the discharge.

In another aspect, a method of discharging a power source of an electric aircraft, the method includes removably attaching an electric aircraft to a charging station to create a charging connection between a power source of the electric aircraft and the charging station, receiving, by a controller of the electric aircraft, a supply request, and initiating, by the controller of the electric aircraft, the power source via the charging connection, wherein discharging the power source comprises a current depth of discharge of the power source exceeding at least a predetermined discharge level and obtaining power data associated with the discharge.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
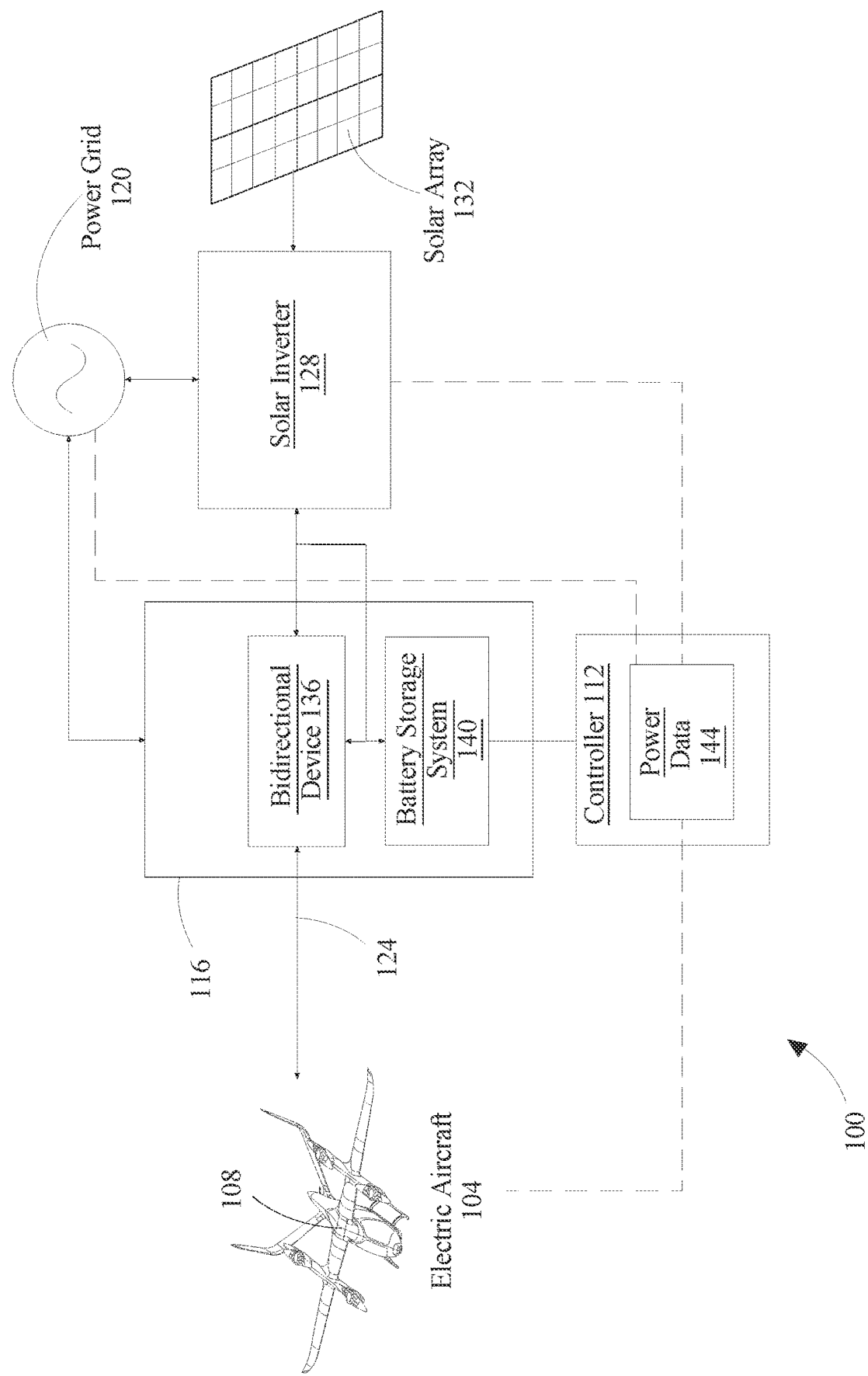
FIG. 1 is a block diagram illustrating an exemplary embodiment of a system for bidirectional charging in accordance with one or more aspects of the present disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for bidirectional charging. More specifically, a system facilitating a bidirectional transfer of power between a charging station and one or more power sources of an electric vehicle via a charging connection. The charging connection may be between a power grid, using charging station, and electric vehicle (e.g., electric aircraft) so that one may charge the other upon a request to deliver electrical power.

In some aspects, charging stations, such as chargers, may allow bidirectional charging (e.g., DC-to-DC charging) between electric vehicle and charging station. Bidirectional charging facilitated by charging station may be used to satisfy fuel reserve requirements by allowing power source of electric vehicle to be discharged on occasion to determine measurement data associated with actual electric characteristics of power source when a state of charge (SOC) of power source is below a minimum state of charge, such as when power source is fully discharged (i.e. SOC of 0%).

In some aspects, it may be desirable to discharge power source at a high enough power level to sufficiently excite battery modules and/or battery cells or power source. Discharging power source at such a power level can mimic load during conventional take-off and landing (CTOL), which may be how an electric aircraft lands on reserves. Charging station and/or electric aircraft may include a cooling system to maintain a repeatable temperature of power source during bidirectional charging.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, an exemplary embodiment of a system 100 for bidirectional charging is shown. In one or more embodiments, system 100 includes an electric aircraft 104, which includes one or more power sources 108, as discussed further in this disclosure. In various embodiments, system 100 includes a controller 112 communicatively connected to electric aircraft 104. Controller 112 may be configured to receive a supply request (e.g., such as a charge request from a user or a signal to activate a maintenance routine). Controller 112, as non-limiting examples, may include a flight controller and/or a battery management system as discussed in this disclosure. Controller 112 may also be configured to initiate a discharge of power source 108 using, for example, a charging station 116 in electric communication with electric aircraft 104 via a charging connection 116. The discharge of power source may include a current depth of discharge (e.g., real-time depth of discharge) of power source 108 reaching at least a predetermined discharge level, as discussed further in this disclosure.

In several embodiments, charging station 116 may be used to discharge power source 108. For the purpose of this disclosure, a "charging station" is a device configured to facilitate delivery of electrical power to an electric vehicle. For instance, and without limitation, charging station may be configured to facilitate delivery of an electrical power between an electric aircraft 104 and a power grid 120. In another instance, charging station may be configured to facilitate delivery of electrical power between a power source of electric charging station 116 and electric aircraft 104. In some embodiments, charging station may include a charger. For the purposes of this disclosure, a "electric aircraft" is a mobile structure configured to fly. In one or more embodiments, electric aircraft 104 may be electrically connected to charging station 116. Charging station 116 may include an infrastructure that allows for the recharging of one or more power sources of electric aircraft 104. Charging station 116 may have a plurality of connections to comply with various electric aircraft needs. In one embodiment, charging station 116 may switch between power transfer standards, such as the combined charging system standard (CCS) and CHAdeMO standards. In another embodiment, charging station 116 may adapt to multiple demand response interfaces. Charging station 116 may include an ADR 2.0 as a demand response interface.

With continued reference to FIG. 1, system 100 may include a bidirectional charging connection 124 (also referred to as a "charging connection" in this disclosure). For the purposes of this disclosure, a "bidirectional charging connection" is a connection associated with transfer of electrical power between a power source of an electric aircraft and a charging station, where the transfer of electrical power may occur in either direction. For instance, and without limitation, bidirectional charging connection 124 may facilitate a transfer of power between a power source 108, such as battery pack 300 of FIG. 3, of an electric vehicle and a power source of charging station 116 and/or a power grid 120. For example, and without limitation, charging connection 124 may facilitate the charging of power source 108 of electric aircraft 104. For the purposes of this disclosure, a "power source" is a device configured to generate, store, or provide electrical energy. Charging connection 124 may be a wired or wireless connection. Charging connection 124 may include a communication between power grid 120 and electric aircraft 104 that is created by electric aircraft 104 being connected to charging station 116, as discussed further in this disclosure. For example, and without limitation, one or more communications between charging station 116, power grid 120, and electric aircraft 104 may be facilitated by charging connection 124. As used in this disclosure, "communication" is an attribute where two or more relata interact with one another, for example, within a specific domain or in a certain manner. In some cases, communication between two or more relata may be of a specific domain, such as, and without limitation, electric communication, fluidic communication, informatic communication, mechanic communication, and the like. As used in this disclosure, "electric communication" is an attribute wherein two or more relata interact with one another by way of an electric current or electricity in general. For example, and without limitation, a communication between charging station 116 and electric aircraft 104 may include an electric communication, where a current flows between charging station 116 and electric aircraft 104. As used in this disclosure, "informatic communication" is an attribute wherein two or more relata interact with one another by way of an information flow or information in general. For example, an informatic communication may include a sensor of charging station 116, electric aircraft 104, or a remote device that provides information to a controller 112 of electric aircraft 104. In another example, and without limitation, an informatic communication may include a request signal, such as a demand request or a supply request, being transmitted between power grid 120, electric aircraft 104, and/or charging station 116. As used in this disclosure, "mechanic communication" is an attribute wherein two or more relata interact with one another by way of mechanical means, for instance mechanic effort (e.g., force) and flow (e.g., velocity). For example, a fastener of a connector of charging station 116 may physically mate with a port of electric aircraft 104 to create a mechanic communication between electric aircraft 104 and charging station 116, as discussed further in FIG. 2. For the purposes of this disclosure, a "connector" is a component of a charging station that mechanically connects to a device or system to create a charging connection between the charging station and the device or system.

In one or more embodiments, communication of charging connection 124 may include various forms of communication. For instance, communication of a charging connection 124 may include a wireless communication. For example, and without, charging connection 124 may include an informatic communication where electric aircraft 104 may transmit a demand request and/or data to charging station 116 via a wireless communication. A network may be used to facilitate communication between charging station 116 and electric aircraft 104. For instance, and without limitation, a multi-node network may be used to communicate data between electric aircraft 104 and charging station 116. A multi-node network may include a mesh network, for instance and without limitation, as described in U.S. Non-provisional application Ser. No. 17/478,067 filed Sep. 17, 2021, titled "SYSTEM FOR A MESH NETWORK FOR USE IN AIRCRAFTS," the entirety of which is incorporated herein by reference. Data may include a flight plan, expected or current demand request, flight maneuver data, state of charge of a power source, and the like. In one or more embodiments, controller 112 may make a demand forecast based on information provided by electric aircraft 104. For example, and without limitation, controller 112 may use machine-learning to determine a demand forecast based on, for example, a demand request of electric aircraft 104. A machine-learning model may be created using training data, as further described in FIG. 7. For example, and without limitation, a machine-learning module and/or process may use a training data set, which includes training data, to generate an algorithm and create a machine-learning model that can determine a demand or supply forecast of an electric vehicle and/or power grid. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may include contain correlations that a machine-learning process may use to model relationships between two or more categories of data elements. The exemplary inputs and outputs may come from a database or be provided by a user. For example, and without limitation, inputs with known associated outputs may be inputted into a machine-learning model. The machine-learning module, which may then generate a machine-learning model that is trained using the training data so that the machine-learning model may receive inputs with unknown outputs and determine the corresponding outputs. In one or more embodiments, inputs may include operation data, which, for the purposes of this disclosure, is data representing electrical power needs and/or uses of an electric vehicle, such as expected maneuvers, travel plans, a state of charge of a power source of an electric vehicle, a depth of discharge of a power source of an electric vehicle, and the like. For the purposes of this disclosure, a "depth of discharge" is an amount of charge removed from a power source at a given state related to the total amount of charge that can be stored in the power source. Using input data, a machine-learning model may determine a demand forecast, where a demand forecast, for the purposes of this disclosure, is an anticipated demand request of the electric aircraft from the power grid.

In other exemplary embodiments of communication, and without limitation, an electrical contact without making physical contact, for example, by way of inductance, may be made between charging station 116 and electric aircraft 104 and/or power grid 120 to facilitate communication. Exemplary conductor materials include metals, such as without limitation copper, nickel, steel, and the like. In one or more embodiments, a contact of charging station 116 may be configured to provide electric communication with a mating component within port of electric aircraft 104.

In one or more embodiments, contact may be configured to mate with an external connector. In one or more embodiments, connector may be positioned at a distal end of a tether or a bundle of tethers, e.g., hose, tubing, cables, wires, and the like, of charging station 116, and connector may be configured to removably attach with a mating component, for example and without limitation, a port of electric aircraft 104, as discussed further in this disclosure. As used in this disclosure, a "port" is an interface configured to receive another component or an interface configured to transmit and/or receive signal on a computing device. For example, in the case of an electric vehicle port, the port interfaces with a number of conductors and/or a coolant flow paths by way of receiving a connector. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

In one or more embodiments, charging connection includes an electric connection between electric aircraft 104 and charging station 116, as discussed further in this disclosure. Bidirectional charging may include a vehicle-to-grid (V2G) charging connection, a grid-to-vehicle (G2V) charging connection, or combination thereof. A V2G system may include a bidirectional electric vehicle charging station such as a trickle charger and may be used to supply power from an electric aircraft's battery to an electric grid via a DC-to-AC converter system usually embedded in a charging station. In a non-limiting embodiment, V2G may be used to balance and settle local, regional, or national energy needs via smart charging. For example, charging station 116 may power grid 120 in the event of a failure of the electric grid. In another example, charging station 116 may provide power to power grid 120 from power source 108 in order to discharge power source 108. In one or more embodiments, powering the electric grid may be performed via trickle charging by charging station 116. Additionally, charging station 116 may include a vehicle-to-home (V2H) charging. In a non-limiting embodiment, a bidirectional electric vehicle charging station may be used to supply power from an electric aircraft's battery to a house or, possibly, another kind of infrastructure. This may be done via a DC to AC converter of charging station 116. Like V2G, V2H may help to make balance and settle, at a larger scale, local or even national supply grids. In a non-limiting embodiment, charging station 116 may trickle charge power grid 120 by delivering electricity to the power grid 120 from the electric vehicle recharging component's battery storage system 140. A "trickle charge," for the purposes of this disclosure, refers to the process of charging a fully charged battery at a rate equal to its self-discharge rate, thus enabling the battery to remain at its fully charged level. In a non-limiting embodiment, the state of fully charged occurs almost exclusively when the battery is not loaded, as trickle charging will not keep a battery charged if current is being drawn by a load, which may include, but not limited to, a battery of an electric aircraft, supplemental storage unit of an electric grid, and the like. In one or more embodiments, charging station 116 may further deliver power to an electric grid by trickle charging power grid 120 from the electric aircraft's own battery. A trickle charger may include a battery charger that produces a very small current. Trickle charging may include providing a power output exceeding a power consumption requirement of charging station 116. "Power consumption requirement," for the purposes of this disclosure, refer to an electrical energy per unit time, required to operate an electrical component. In a non-limiting embodiment, the electric vehicle recharging component may be configured by at least a computing device, such as controller 112, to increase the power output of a battery storage system 140 of a trickle charger to power grid 120. In a non-limiting embodiment, trickle charging may include charging a battery at a rate equal to a battery's self-discharge rate such that the battery remains at a specific threshold of charge. The computing device may determine a charge cycle including a recharge rate and discharge rate of the battery storage system 140 of charging station 116 as a function of at least a machine-learning model. "Charge cycle," for the purposes of this disclosure, refer to a process of recharging and discharging an electric energy source, such as power source 108, as required into a load which may include, but not limited to, a battery of an electric aircraft or supplemental storage unit of an electric grid, and the like. The charge cycle may be determined as a function of a machine-learning model wherein the machine-learning model may receive a set of training data including, but not limited to, rate of a charge cycle of an electric grid, rate of charge of an electric vehicle, and rate of charge of an electric vehicle recharging component, and train the set with a classification of failure modes to determine the charge cycle to recharge an electric grid when a computing device detects a failure of the electric grid. In a non-limiting embodiment, A trickle charger may deliver a charge cycle that is equal to the power source's rate of self-discharge and should be disconnected once a full charge has been established to avoid overcharging. Charging station 116 may include a maintenance charger that may be designed to stay connected to a battery storage system 140. Once a charge level is set, the trickle charger may automatically turn off and on to maintain a specified charge range.

Still referring to FIG. 1, charging station 116 may include, but is not limited to, a constant voltage charger, a constant current charger, a taper current charger, a pulsed current charger, a negative pulse charger, an IUI charger, throttle charger, and a float charger. Still referring to FIG. 1, charging station 116 may include a bidirectional device 136, such as a transceiver. In other embodiments, electric aircraft 104 may include bidirectional device 136. Bidirectional device 136 may include a DC-distribution system, wherein system is used to regulate and monitor the flow of power between a DC bus and an AC grid and to restrict the voltage expanse at the former to only a certain permissible range of voltages. In other words, a bidirectional inverter is the one that not only performs the DC-to-AC conversion, but also performs the conversion of AC power to DC. In a non-limiting embodiment, bidirectional device 136 may include a DC-to-DC bidirectional converter wherein DC-to-DC bidirectional converter allows power flow in both forward and reverse directions. In a non-limiting embodiment, DC-to-DC bidirectional inverter may convert a fixed DC battery voltage into a higher DC voltage suitable for traction motor. Bidirectional device 136 may also include, but is not limited to, a DC-to-AC inverter, DC-to-AC inverter, and the like. In a non-limiting embodiment, charging station 116 may perform bidirectional charging as a function of an electric vehicle and an electric grid. A person of ordinary skill in the art would appreciate the use of a power inverter in the context of delivering energy from one source to another.

With continued reference to FIG. 1, charging station 116 may deliver charge to an electric vehicle. In a non-limiting embodiment, charging station 116 may deliver electric power to electric aircraft 104 using a trickle charger to trickle charge the electric aircraft as a function of bidirectional charging, as previously discussed I this disclosure. The trickle charger may deliver power stored in the battery storage system 140 and/or from a power storage unit directly from an electric grid to power an electric aircraft. Trickle charging an electric aircraft 104 may include a trickle charging a battery storage system 140 with charging station to fully charged in which a DC-to-DC converter may deliver electricity from the battery to the electric aircraft or a battery unit of the electric aircraft.

Still referring to FIG. 1, charging station 116 may include a battery storage system 140. Battery storage system 112 may include a power storage unit which may include a battery pack. The battery pack may include a plurality of electrochemical battery cells. Battery storage system 140 may include any battery unit or component described herein. In a non-limiting embodiment, a trickle charger may receive power from a battery storage system 140. Battery storage system 140 may include and/or be associated with a DC-to-DC converter to convert power into a variety of voltages for power source 108.

With continued reference to FIG. 1, charging station 116 may throttle charge electric aircraft 104. For example, and without limitation, charging station 116 may be configured to throttle a charge rate by restricting a maximum charge rate to an electric aircraft 104 in order to extend the battery life of a battery pack of electric aircraft 104. In one or more embodiments, different power capabilities of the electric grid 532 may include different charge cycles associated with different times during the day. In a non-limiting embodiment, the power grid 120 may be delivering electric power to charging station 116 at a higher rate of charge during the morning and afternoon of a day and deliver a lower rate of charge during the evening of that day. In other embodiments, charging rates may be determined by environmental factors, such as a time of day or weather conditions. The compensation of electric energy may be determined as a function of a computing device and/or a machine-learning model, as discussed further in this disclosure.

With continued reference to FIG. 1, charging station 116 may receive power from power source 108 of electric aircraft 104 to partially or fully discharge power source 108. In other embodiments, charging station 116 may facilitate a transfer of power from power source to grid. Fully discharging power source 108 may be useful for acquiring power data 120 associated with power source 108 and/or electric aircraft 104, as discussed further in this disclosure. For the purposes of this disclosure, "power data" is information associated with the transfer of electrical power to or from a power source. During operation of an electric aircraft, discharging one or more power sources of electric aircraft is undesirable as deep discharge of power source may result in damaging of the one or more power sources. However, understanding and collecting corresponding measurements associated with electrical characteristics of a power source when fully discharge can be beneficial in case of having to operate electric aircraft in emergency situation where aircraft is required to run on reserves and battery must exceed a desired depth of discharge. Thus, bidirectional charging facilitated by charging station 116 may be used to satisfy various fuel reserve requirements by allowing power source 108 of electric aircraft 104 to be fully discharged on occasion to determine power data associated with actual electrical and physical characteristics of power source 108 when a state of charge (SoC) of power source 108 is below a predetermined discharge level (e.g., a minimum state of charge or a maximum depth of discharge, which is often represented by percentages). For the purposes of this disclosure, a "state of discharge" is the level of charge of a battery source. For the purposes of this disclosure, a "predetermined discharge level" is a value, or range, of capacity or energy of a power source that is not discharged from the power source during normal operation. As a non-limiting example, predetermined discharge level may denote an amount of reserve energy of power source. For the purposes of this disclosure, "reserve energy" is an amount of energy contained within a power source that is reserved for emergency situations. A "full discharge", or "deep discharge", for the purposes of this disclosure, is when the capacity of a power source has been substantially exhausted. For instance, and without limitation, a full discharge may occur when all the energy of a power source, such as a battery pack, has been discharged or used. In some embodiments, and without limitation, charging station 116 may discharge, or drain, power source 108, where discharging power source to predetermined discharge level by reducing a state of charge of power source 108 to approximately 0% SoC or obtaining a 100% depth of discharge (DoD). In other embodiments, and without limitation, charging station 116 may fully or partially discharge power source 108 to a predetermined discharge level, such as, for example, a specific value of DoD or range. For instance, and without limitation, power source 108 may be discharged until a current DoD of power source reaches a predetermined discharge level of more than 80% DoD. In some aspects, charging station 116 may discharge power source at a high enough power level to sufficiently excite battery modules and/or battery cells of power source 108. For example, and without limitation, power source 108 may be discharged at a specific C-rate. Discharging power source 108 at such a power level can mimic load during conventional take-off and landing (CTOL), which may be how electric aircraft 104 lands on reserves. A discharge rate of power source 108 may include battery capacity (Ah) divided the amount of time necessary to achieve a discharge, such as a full discharge or partial discharge of power source. A discharge rate may be set by a user via a user input or may be determined by a computing device, such as controller 112 as a function of previously received data associated with other similar power sources. For example, and without limitation, a user, such as an operator of electric aircraft or personnel, may input a predetermined discharge level using, for example, a computing device, such as controller 112 or a remote device. In another example, and without limitation, inputted historical data, which may be collected using a sensor or other devices, associated with other power sources of the same electric aircraft or other electric aircraft may be used to calculate predetermined discharge level. As discussed further below in this disclosure, charging station 116 and/or electric aircraft 104 may include a cooling system to maintain a repeatable temperature of power source during bidirectional charging or discharge. In one or more embodiments, discharge may be periodic (e.g., occur at intermittent times). For instance, and without limitation, discharge may be triggered by controller 112 during a maintenance routine, which may be initiated automatically when electric aircraft is connected to charging station or may be initiated by a user, such as by a user selecting a maintenance option on a graphical user interface of electric aircraft. In some embodiments, controller 112 may initiate discharge every time that electric aircraft is connected to charging station. In some embodiments, controller 112 may initiate discharge periodically; such as, as non-limiting examples, every 2 times, every 5 times, every 10 times, every 50 times, and the like, that electric aircraft is connected to charging station.

With continued reference to FIG. 1, charging station 116 may be in electrical communication with power grid 120. Power grid 120 may include, but not limited to, a power station, electrical substation, electric power transmission, electric power distribution, and the like. Electric grid may refer to any interconnected network for delivering electricity from a first entity to a second entity. "Entity," as used in this disclosure, refers to any entity that retrieves, stores, and/or outputs an energy source including, but not limited to, a producer, consumer, home, business, other infrastructure, electric vehicle, eVTOL, and the like. In one or more embodiments, power grid 120 may be in communication with at least a photovoltaic (PV) module, for instance by way of intermediate components (e.g., solar inverter 128). The PV module may include, but is not limited to, a plurality of solar panels, a plurality of solar arrays 132, any combination thereof, and the like. Power grid 120 may supply electricity to entities within a specific geographical location or deliver electricity from a first entity to a second entity.

Still referring to FIG. 1, power grid 120 may be in communication with a solar inverter 128. Solar inverter may include, but is not limited to, a stand-alone inverter, grid-tie inverter, battery backup inverter, intelligent hybrid inverter, and the like. Solar inverter 128 may include a type of electrical converter which converts the variable direct current (DC) output of a photovoltaic (PV) solar panel into a utility frequency alternating current (AC) that can be fed into a commercial power grid (e.g., electric grid) or used by a local, off-grid electrical network. In one embodiment, solar inverter 128 may be configured to absorb solar energy and transform the solar energy into electrical energy. Additionally, battery storage system 140 can also supply the power grid 120 or solar inverter 128 with internally stored energy. In a non-limiting embodiment, in installations with a uni-directional inverter, most of the existing installations of the battery storage system 140 could be connected (as an option) on the AC side of the solar inverter 128.

Still referring to FIG. 1, system 100 may include controller 112. In some embodiments, controller 112 may include or be incorporated into a device remote from electric aircraft 104 and charging station 116. In other embodiments, charging station 116 may include controller 112. In other embodiments, electric aircraft 104 may include controller 112. In other embodiments, grid may include controller 112. Controller 112 may include or be a component of a computing device. Computing device may include any computing device as described in this disclosure, including without limitation a microcontroller, microprocessor, digital signal processor (DSP), a flight controller, and/or system on a chip (SoC) as described in this disclosure. Computing device may include, be included in, and/or communicate with a mobile device such as a mobile telephone or smartphone. In several embodiments, controller 112 may include a battery management component of power source 108, such as battery management component 336 of FIG. 3. For instance, and without limitation, battery management component (also referred to as a "battery management system" or "BMS")) may be attached to power source 108 and monitor characteristics of power source 108. Battery management component may initiate or terminate discharge process described in this process. Battery management component may be communicatively connected to sensors of system 100 or include sensors of system 100. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of charging station 116 and/or computing device.

With continued reference to FIG. 1, computing device may be designed and/or configured to perform any method, method step, or sequence of method steps in any embodiment described in this disclosure, in any order and with any degree of repetition. For instance, [computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in one or more embodiments, controller 112 may receive a power data 144. A "power datum," for the purposes of this disclosure, refers to data associated with physical or electrical characteristics of charging connection or power source 108. For instance, and without limitation, power data 144 may include information representing the charge and/or flow of electricity from one energy source to another energy source. In another example, and without limitation, power data 144 may include a SoC of power source 108, a voltage rating of power source 108, a DoD of power source 108, a temperature of power source 108, a temperature of a connector of charging station, or the like. In several embodiments, power data information may only include information associated with energy of power source when a current discharge of power source 108 reaches predetermined discharge level (e.g., when battery power is at reserve energy levels). For instance, and without limitation, power data may include temperature ranges or SoC readings once a DoD of power sources reaches or exceeds predetermined discharge level (e.g., 80% DoD).

Still referring to FIG. 1, controller 112 may be communicatively connected to a sensor and/or sensor suite. Sensor may include one or more sensors, such as a sensor suite, sensor array, or independent sensors, that may be attached to electric aircraft 104, charging station 116, and/or grid 120. Sensor may include, but is not limited to, a multimeter, voltmeter, valve electrometer, solid-state electrometer, and the like. In a non-limiting embodiment, controller 112 may receive a plurality of data from an electric aircraft, charging station, and an electric grid to provide ancillary services to system 100. Ancillary services may include functions that help grid operators maintain a reliable electricity system. Ancillary services may maintain the proper flow and direction of electricity, address imbalances between supply and demand, and help the system recover after a power system event. Ancillary services may include recharging an electric grid in the event of a failure of the electric grid wherein the controller may direct a trickle charge from at least a battery storage system 140 to power grid 120. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, voltage, current, pressure, and the like, into a sensed signal. Sensor may detect a plurality of data about charging connection, electric aircraft 104, power grid 120, and/or charging station 116. A plurality of data about, for example, charging connection may include, but is not limited to, battery quality, battery life cycle, storage unit capacity, storage unit SoC, remaining battery capacity, current, voltage, pressure, temperature, moisture level, and the like. In one or more embodiments, and without limitation, sensor may include a plurality of sensors. In one or more embodiments, and without limitation, sensor may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, state of charger (SOC) sensors, and the like. For example, and without limitation, SOC sensor may be communicatively connected to controller 112 and power source 108, and SOC sensor may be configured to detect power data associated with an energy level of power source 108. In one or more embodiments, sensor may be a contact or a non-contact sensor. For instance, and without limitation, sensor may be connected to electric aircraft 104, power grid 120, charging station 116, and/or a controller 112. In other embodiments, sensor may be remote to electric aircraft 104, charging station 116, power grid 120, and/or controller 112. Signals may include electrical, electromagnetic, visual, audio, radio waves, or another undisclosed signal type alone or in combination.

Still referring to FIG. 1, sensor may include a plurality of independent sensors, where any number of the described sensors may be used to detect any number of physical or electrical quantities associated with communication of charging connection. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor to detect phenomenon may be maintained.

Still referring to FIG. 1, In one or more embodiments, sensor may include electrical sensors. Electrical sensors may be configured to measure voltage across a component, electrical current through a component, and resistance of a component. In one or more embodiments, sensor may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor, may be measured in Fahrenheit (° F.), Celsius (° C.), Kelvin (° K), or another scale alone or in combination. The temperature measured by sensors may comprise electrical signals, which are transmitted to their appropriate destination wireless or through a wired connection.

Still referring to FIG. 1, a supply request may be transmitted to system 100, such as to controller 112 of system 100. For the purposes of this disclosure, a "supply request" is a signal requesting that power be transferred from power source 108 of electric aircraft 104 to power grid 120 using charging station 116. In one or more embodiments, supply request may also include data regarding the amount of power to be transferred between electric aircraft 104 and power grid 120, the price of the transaction, verification data, which may include data regarding the type of electric vehicle and authority to use a particular power grid 120 and/or charging station 116, or the like. The transfer of power stored in power source 108 to a local power grid via charging connection created by charging station 116 allows power source 108 to be fully discharge and for power grid 120 to meet high demands of power. In one or more embodiments, sensor may detect a SoC or DoD of power source during the transfer of energy from power source 108 to grid 120. In various embodiments, supply request may be transmitted by a remote devise or inputted by a user into an interface of electric aircraft 104, charging station 116, or grid 120. In response to the received supply request, controller 112 may initiate a transfer of power from power source 108 to grid 120. For instance, and without limitation, controller may activate charging station 116 to pull electrical power from power source 108 and thus discharge power source 108 at a specific rate. In one or more embodiments, sensor may detect a status, condition, and/or any other parameters of power source 108 and/or charging connection to generate associated power data. For example, and without limitation, a battery management component of power source 108 may include sensor, which detects an SoC of power source 108, which may be subsequently provided to charging station or grid, such as displays and/or user interfaces of charging station and grid, so that a SoC and DoD may be monitored and discharge rate and/or temperature regulation of power source may be altered or maintained as a function of the detected power data. For instance, and without limitation, controller may receive power data comprising a temperature reading associated with a temperature of power source 108 and then activate an integrated cooling system of electric aircraft or charging station to regulate the temperature of power source so that temperature of power source falls within predetermined threshold or range, as discussed further in this disclosure. Additional disclosure related to temperature management and cooling systems of power sources and charging stations can be found in U.S. patent application Ser. No. 17/884,359 entitled "COOLING SYSTEM AND METHODS FOR REGULATING A TEMPERATURE OF AN ELECTRIC AIRCRAFT POWER SUPPLY DURING CHARGING", U.S. patent application Ser. No. 17/405,840 entitled "CONNECTORS AND METHODS OF USE FOR CHARGING AN ELECTRIC VEHICLE", U.S. patent application Ser. No. 17/702,195 entitled "SYSTEMS AND METHODS FOR VENTING OF A POWER SOURCE OF AN ELECTRIC AIRCRAFT", the entirety of each which is incorporated herein by reference. In one or more embodiments, power data or other information related to the transfer of power between electric aircraft 104 and power grid 120 via charging connection may be shown on a display of charging station 116 and/or a remote device for a user to view.

Figure 2:
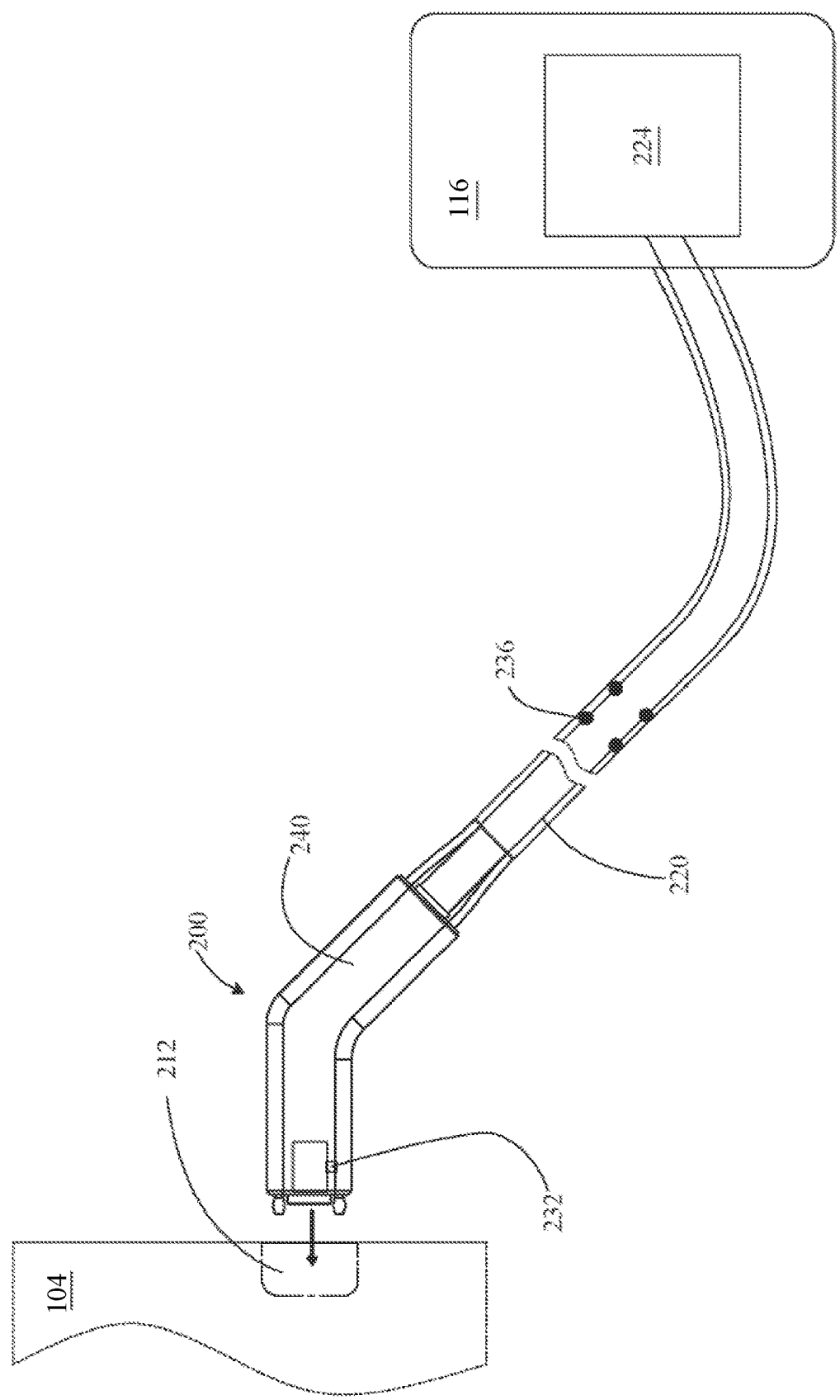
FIG. 2 illustrates an exemplary schematic of an exemplary connector of a charging station in accordance with one or more aspects of the present disclosure.

Referring now to FIG. 2, an exemplary embodiment of a connector 200 of charging station 116 for creating a charging connection between electric aircraft 104 and charging station 116 is illustrated in accordance with one or more embodiments of the present disclosure. In one or more embodiments, charging station 116 may allow a discharging of power source 108 of electric aircraft 104 via charging connection between electric aircraft 104 and power grid 120 that is facilitated by charging station 116, as previously discussed in this disclosure. As used in this disclosure, "discharging" refers to a process of decreasing energy stored within a power source. In some cases, power source includes a battery pack with battery modules and battery cells, as discussed further in this disclosure, and an electrical energy may be transmitted from power source and to grid via charging connection.

Still, referring to FIG. 2, connector 200 includes a housing 240 configured to attach with an electric aircraft port 212 (also referred to herein as a "port") of an electric aircraft 104 to facilitate a charging connection between charging station and the electric aircraft, wherein the housing includes a fastener for removable attachment with the port. In one or more embodiments, connector may be placed at a distal end of a tether or a bundle of tethers, e.g., hose, tubing, cables, wires, and the like, which is configured to removably attach with a mating component, for example without limitation a port. In the case of a computing device port, the port may provide an interface between a signal and a computing device. A connector may include a male component having a penetrative form and port may include a female component having a receptive form that is receptive to the male component. Alternatively or additionally, connector may have a female component and port may have a male component. In some cases, connector may include multiple connections, which may make contact and/or communicate with associated mating components within port, when the connector is mated with the port. As used in this disclosure, a "housing" is a physical component within which other internal components are located. In some cases, internal components with housing will be functional while function of housing may largely be to protect the internal components. Housing and/or connector may be configured to mate with a port, for example, port 212. As used in this disclosure, "mate" is an action of attaching two or more components together. As used in this disclosure, an "electric vehicle port" is a port located on an electric aircraft 104. Mating may be performed using an mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connector 200. In some cases, mate may be lockable. As used in this disclosure, an "electric vehicle" is any electrically power means of human transport, for example without limitation an electric aircraft or electric vertical take-off and landing aircraft. In some cases, an electric vehicle will include an energy source configured to power at least a motor configured to move the electric aircraft 104.

With continued reference to FIG. 2, connector 200 and/or housing of connector may include a fastener. As used in this disclosure, a "fastener" is a physical component that is designed and/or configured to attach or fasten two (or more) components together. Connector may include one or more attachment components or mechanisms, for example without limitation fasteners, threads, snaps, canted coil springs, and the like. In some cases, connector may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minnesota. Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector may be connected to port by way of magnetic force. For example, connector may include one or more of a magnetic, a ferromagnetic material, and/or an electromagnet. Fastener may be configured to provide removable attachment between connector 200 and at least a port, for example electrical vehicle port 212. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 2, connector 200 may include a conductor 220 configured to conduct a current of charging connection. In one or more embodiments, connector 200 may include one or more conductors 220 having a distal end approximately located within connector 200. As used in this disclosure, a "conductor" is a component that facilitates conduction. As used in this disclosure, "conduction" is a process by which one or more of heat and/or electricity is transmitted through a substance, for example when there is a difference of effort (i.e. temperature or electrical potential) between adjoining regions. In some cases, a conductor 220 may be configured to charge and/or recharge an electric vehicle. For instance, conductor 220 may be connected to a energy source 224 and conductor may be designed and/or configured to facilitate a specified amount of electrical power, current, or current type. For example, a conductor 220 may include a direct current conductor 220. As used in this disclosure, a "direct current conductor" is a conductor configured to carry a direct current for recharging an energy source 224. As used in this disclosure, "direct current" is one-directional flow of electric charge. In some cases, conductor 220 may include an alternating current conductor. As used in this disclosure, an "alternating current conductor" is a conductor configured to carry an alternating current for recharging an energy source 224. As used in this disclosure, an "alternating current" is a flow of electric charge that periodically reverse direction; in some cases, an alternating current may change its magnitude continuously with in time (e.g., sine wave).

With continued reference to FIG. 2, charging station 116 may include a controller 112, as previously mentioned in this disclosure. In one or more embodiments, controller 112 is configured to receive a supply request or a demand request from power grid 120 or electric aircraft 104, respectively. In one or more embodiments, controller 112 may include any computing device as described in this disclosure, including without limitation a microcontroller, microprocessor, digital signal processor (DSP), logic circuit, integrated circuit (ASIC), FPGA, flight controller, control circuit, computing device, and/or system on a chip (SoC). In one or mor embodiments, controller 112 may be configured to a control charging connection between electric aircraft 104 and charging station 116. In some embodiments, controller 112 may initiate charging according to a request signal, such as supply request, from either electric aircraft 104 or power grid 120. Controller 112 may include a single computing device operating independently, or may include two or more computing devices operating in concert, in parallel, sequentially or the like; two or more computing devices may be included together in a single computing device or in two or more computing devices. Controller 112 may interface or communicate with one or more additional devices as described below in further detail via a network interface device. Network interface device may be utilized for connecting controller 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 112 may include but is not limited to, for example, a computing device or cluster of computing devices in a first location and a second computing device or cluster of computing devices in a second location. Controller 112 may include one or more computing devices dedicated to data storage, security, distribution of traffic for load balancing, and the like. Controller 112 may distribute one or more computing tasks as described below across a plurality of computing devices of computing device, which may operate in parallel, in series, redundantly, or in any other manner used for distribution of tasks or memory between computing devices. Controller 112 may be implemented using a "shared nothing" architecture in which data is cached at the worker, in an embodiment, this may enable scalability of system and/or computing device.

With continued reference to FIG. 2, controller 112 may be designed and/or configured to perform any method, method step, or sequence of method steps in any embodiment described in this disclosure, in any order and with any degree of repetition. For instance, controller 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 2, in one or more embodiments, controller 112 may be configured to control charging connection and/or charging station 116 via a control signal. For instance, and without limitation, an electrical charging or discharging current through conductor 220 may be controller by controller 112 as a function of a request signal from a user or a sensor. In one or more embodiments, connector 200 may be configured such that a conductor 220 may make a connection with a mating component on within port 212 of electric aircraft 104 when the connector 200 is mated with port 212. As used in this disclosure, a "mating component" is a component that is configured to connected with at least another component, for example in a certain (i.e. mated) configuration. As used in this disclosure, a "control signal" is an electrical signal containing information that changes a performance of a connector and/or charging station. In this disclosure, "control pilot" is used interchangeably in this application with control signal. In some embodiments, control signal may be analog. In some cases, control signal may be digital. Control signal may be communicated according to one or more communication protocols, for example without limitation Ethernet, universal asynchronous receiver-transmitter, and the like. In some cases, control signal may be a serial signal. In some cases, control signal may be a parallel signal. Control signal may be communicated by way of a network, for example a controller area network (CAN). In some cases, control signal includes commands to operate a connector 200 of charging station 116, as previously mentioned. For example, and without limitation, control signal may control flow of an electric recharging current or switches, relays, direct current to direct current (DC-DC) converters, and the like. In some cases, one or more circuits within energy source 224 or within communication with energy source 224 are configured to affect a parameter of electrical recharging current according to a control signal from controller 112, such that the controller 112 may control a parameter of the electrical charging current provided to either power grid 120 or electric aircraft 104. For example, in some cases, controller 112 may control one or more of current (Amps), potential (Volts), and/or power (Watts) of electrical charging current by way of control signal. In some cases, controller 112 may be configured to selectively engage electrical charging current, for example ON or OFF by way of control signal. In some cases, a supply request and control signal may include an analog signal or a digital signal. In some cases, supply request and control signal may be communicated from one or more sensors, for example, located within electric vehicle (e.g., within an electric vehicle port) and/or located within charging station 116, such as connector 200. In one or more embodiments, supply request is a command from a user or local and/or remote device. In some cases, a sensor, a circuit, and/or a controller 112 may perform one or more signal processing steps on a signal. For instance, sensor, circuit or controller 112 may analyze, modify, and/or synthesize a signal in order to improve the signal, for instance by improving transmission, storage efficiency, or signal to noise ratio.

Still referring to FIG. 2, exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 2, charging station 116 may include a sensor, as previously mentioned in this disclosure. As used in this disclosure, a "sensor" is a device that is configured to detect a phenomenon and transmit information related to the detection of the phenomenon. For example, in some cases a sensor may transduce a detected phenomenon, such as without limitation temperature, pressure, and the like, into a sensed signal. As used in this disclosure, a "proximity sensor" is a sensor that is configured to detect at least a phenomenon related to connecter being mated to a port of an electric vehicle. Proximity sensor may include any sensor described in this disclosure, including without limitation a switch, a capacitive sensor, a capacitive displacement sensor, environmental sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In one or more embodiments, charging station 116 may include a sensor communicatively connected to power source 108 of electric aircraft 104 and configured to detect a parameter and/or characteristic of power source 108 (e.g., power data). In one or more embodiments, sensor is configured to identify a communication of charging connection. For instance, and without limitation, sensor may recognize that a charging connection has been created between charging station 116 and electric aircraft 104 that facilitates communication between charging station 116 and electric aircraft 104. For example, and without limitation, sensor may identify a change in current through a connector of charging station 116, indicating whether charging station is providing power to electric aircraft 104 or power grid 120, as previously mentioned in this disclosure.

With continued reference to FIG. 2, charging station 116 may include an energy source 224 configured to provide an electrical charging current. As used in this disclosure, a "energy source" is a source of electrical power, for example for charging a battery or storage unit. In some cases, energy source 224 may include a charging battery (i.e. a battery used for charging other batteries. A charging battery is notably contrasted with an electric vehicle battery, which is located for example upon an electric aircraft. As used in this disclosure, an "electrical charging current" is a flow of electrical charge that facilitates an increase in stored electrical energy of an energy storage, such as without limitation a battery. Charging battery 224 may include a plurality of batteries, battery modules, and/or battery cells. Charging battery 224 may be configured to store a range of electrical energy, for example a range of between about 5 KWh and about 5,000 KWh, that may be receive from power grid 120.

Still referring to FIG. 2, in some embodiments, charging station 116 may additionally include an alternating current to direct current converter configured to convert an electrical current of charging connection from an alternating current. As used in this disclosure, an "analog current to direct current converter" is an electrical component that is configured to convert analog current to digital current. An analog current to direct current (AC-DC) converter may include an analog current to direct current power supply and/or transformer. In some cases, AC-DC converter may be located within an electric vehicle and conductors may provide an alternating current to the electric vehicle by way of conductors 220 and connector 200. Alternatively and/or additionally, in some cases, AC-DC converter may be located outside of electric vehicle and an electrical charging current may be provided by way of a direct current to the electric vehicle. In some cases, AC-DC converter may be used to recharge a charging battery. In some embodiments, energy source 224 may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. In some embodiments, energy source 224 may be charged by a power source of electric aircraft 104 and then provide power to power grid 120.

Still referring to FIG. 2, in some embodiments, a direct current conductor and an alternating current conductor may be further configured to conduct a communication signal and/or control signal by way of power line communication. In some cases, controller 112 may be configured within communication of communication signal, for example by way of a power line communication modem. As used in this disclosure, "power line communication" is process of communicating at least a communication signal simultaneously with electrical power transmission. In some cases, power line communication may operate by adding a modulated carrier signal (e.g., communication signal) to a power conductor. Different types of power-line communications use different frequency bands. In some case, alternating current may have a frequency of about 50 or about 60 Hz. In some cases, power conductor may be shielded in order to prevent emissions of power line communication modulation frequencies. Alternatively or additionally, power line communication modulation frequency may be within a range unregulated by radio regulators, for example below about 500 KHz.

Figure 3:
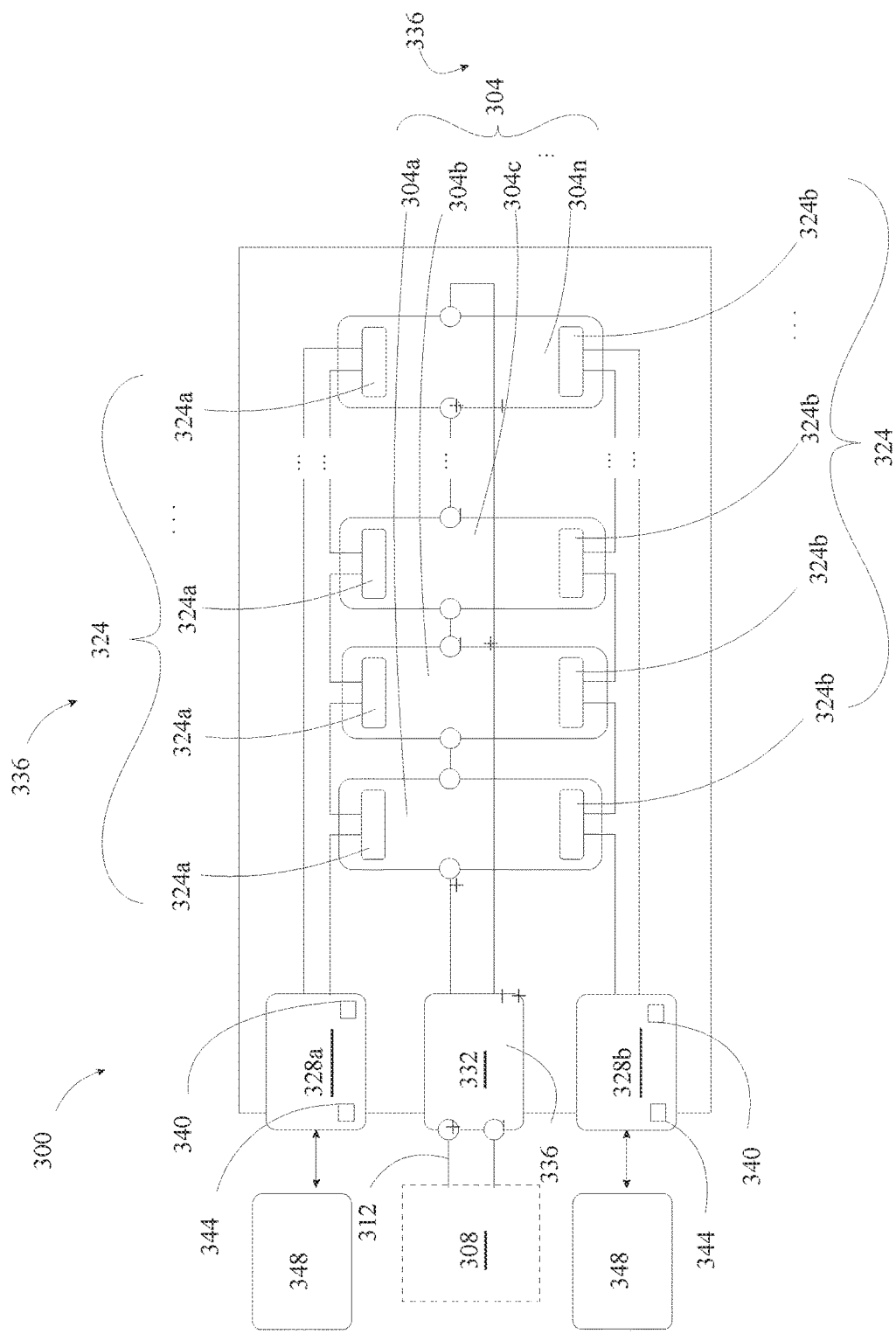
FIG. 3 is a block diagram of an exemplary embodiment of a battery pack in one or more aspects of the present disclosure.

Referring now to FIG. 3, an exemplary embodiment of power source, battery pack 300, is presented in accordance with one or more embodiments of the present disclosure. In one or more embodiments, electric aircraft battery pack 300 (also referred to herein as a "battery pack") includes a battery module 304, which is configured to provide energy to an electric aircraft 308 via a power supply connection 312. For the purposes of this disclosure, a "power supply connection" is an electrical and/or physical communication between a battery module 304 and electric aircraft 308 that powers electric aircraft 308 and/or electric aircraft subsystems for operation. In one or more embodiments, battery pack 300 includes a plurality of battery modules, such as modules 304*a-n*. For example, and without limitation, battery pack 300 may include fourteen battery modules. In one or more embodiments, each battery module 304*a-n* may include a battery cell. For example, and without limitation, battery module 304 includes a plurality of battery cells.

Still referring to FIG. 3, battery pack 300 includes a battery management component 336 (also referred to herein as a "management component"). For the purposes of this disclosure, a "battery management component" is an element of a power source configured to monitor and control one or more functions and thus parameters of the power source. In one or more embodiments, battery management component 336 may be integrated into battery pack 300 in a portion of battery pack 300 or a subassembly thereof. One of ordinary skill in the art will appreciate that there are various areas in and on a battery pack and/or subassemblies thereof that may include battery management component 336. In one or more embodiments, battery management component 336 may be disposed directly over, adjacent to, facing, and/or near a battery module and specifically at least a portion of a battery cell.

Still referring to FIG. 3, battery management component 336 includes a module monitor unit (MMU) 324, a pack monitoring unit (PMU) 328, and may also include a voltage disconnect 332. In one or more embodiments, battery management component 336 may include or at least be communicatively connected to a sensor 316. Sensor 316 may include a sensor suite 400, as discussed further in FIG. 4. Sensor 316 is configured to detect power data, such as power data 144. In various embodiments, power data 144 may include a discharge metric. "Discharge metric," for the purposes of this disclosure, is a measurement relating to the state of battery pack 300. For example, without limitation, a discharge metric may include real-time characteristics of power source, such as a current state of charge, a current depth of discharge, a current temperature, a current moisture level, a humidity, a voltage, a current, vent gas, vibrations, chemical content, or other measurable characteristics of battery pack 300 or components thereof, such as battery module 304 and/or battery cell. Sensor 316 may generate a sensor output signal, which transmits information and/or datum related to a sensor detection. Sensor output signal may be transmitted to charging station 116, electric aircraft, and/or grid 120, as previously discussed in this disclosure. Sensor output signal may include any signal form described in this disclosure, for example digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio. In one or more embodiments, battery management component 336 includes MMU 324, which is mechanically connected and communicatively connected to battery module 304. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. In one or more embodiments, MMU 324 may contain sensor 316. MMU 324 is configured transmit a discharge metric from sensor 316. Additional disclosure related to a module monitoring system can be found in U.S. patent application Ser. No. 17/529,447 entitled "A MODULE MONITOR UNIT FOR AN ELECTRIC AIRCRAFT BATTERY PACK AND METHODS OF USE", entirety of which in incorporated herein by reference.

Still referring to FIG. 3, in one or more embodiments, MMU 324 is configured to transmit a discharge metric of battery module 304. MMU 324 may generate an output signal that includes a sensor output signal, such as a discharge metric. In one or more embodiments, discharge metric may be transmitted by MMU 324 to PMU 328 so that PMU 328 receives discharge metric, as discussed further in this disclosure. For example, MMU 324 may transmit metrics to a controller, such as controller 112 and/or controller 340 of PMU 328. In one or more embodiments, MMU 324 may include a plurality of MMUs. For instance, and without limitation, each battery module 304*a-n* may include one or more MMUs 324. For example, and without limitation, each battery module 304*a-n* may include two MMUs 324*a,b*. MMUs 324*a,b* may be positioned on opposing sides of battery module 304. Battery module 304 may include a plurality of MMUs to create redundancy so that, if one MMU fails or malfunctions, another MMU may still operate properly and continue to monitor corresponding battery module 304. In one or more non-limiting exemplary embodiments, MMU 324 may include mature technology so that there is a low risk. Furthermore, MMU 324 may not include software to, for example, increase reliability and durability of MMU 324 and thus, avoid complications often inherent with using software applications. MMU 324 may be configured to monitor and balance all battery cell groups of battery pack 300 during charging of battery pack 300. For instance, and without limitation, MMU 324 may monitor a temperature of battery module 304 and/or a battery cell of battery module 304. For example, and without limitation, MMU 324 may monitor a battery cell group temperature. In another example, and without limitation, MMU 324 may monitor a terminal temperature of battery module 304 to, for example, detect a poor high voltage (HV) electrical connection. In one or more embodiments, an MMU 324 may be indirectly connected to PMU 328. In other embodiments, MMU 324 may be directly connected to PMU 328. In one or more embodiments, MMU 324 may be communicatively connected to an adjacent MMU 324.

Still referring to FIG. 3, battery management component 336 includes PMU 328, which is communicatively connected to MMU 324. In one or more embodiments, PMU 328 includes controller 340, which is configured to receive discharge metric from MMU 324. In one or more embodiments, PMU 328 may receive discharge metric from MMU 324 via communication component, such as via communicative connections. For example, PMU 328 may receive discharge metric from MMU 324 via an isoSPI transceiver. In one or more embodiments, controller 340 of PMU 328 is configured to identify a battery condition of battery module 304 as a function of discharge metric. For the purposes of this disclosure, a "battery condition" is a state and/or working order of battery pack 300 and/or any components thereof. For example, and without limitation, a battery condition may include a state of charge (SoC), a depth of discharge (DoD), a temperature reading, a moisture/humidity level, a gas level, a chemical level, or the like. In one or more embodiments, controller 340 of PMU 328 is configured to determine a critical event element if battery condition is outside of a predetermined threshold (also referred to herein as a "threshold"). For the purposes of this disclosure, a "critical event element" is a failure and/or critical battery condition of a battery pack and/or components thereof that may be harmful to a battery pack and/or corresponding electric aircraft. For instance, and without limitation, if an identified battery condition, such as a temperature of a battery cell of battery pack 300, does not fall within a predetermined threshold, such as a range of acceptable, operational temperatures of a battery cell, then a critical event element is determined by controller 340 of PMU 328. For example, and without limitation, PMU 328 may use discharge metric from MMU 324 to identify a temperature of 95° F. for a battery cell. If the predetermined temperature threshold is, for example, 75 to 90° F., then the determined battery condition is outside of the predetermined temperature threshold, such as exceeding the upper threshold of 90° F., and a critical event element is determined by controller 340. As used in this disclosure, a "predetermined threshold" is a limit and/or range of an acceptable quantitative value or representation related to a normal battery condition and/or state of a battery pack and/or components thereof. In one or more embodiments, a battery condition outside of a threshold is a critical battery condition, which triggers a critical event element. A battery condition within the threshold is a normal battery condition, which indicates that a battery pack is working properly, and no critical event element is determined. For example, and without limitation, if a battery condition of temperature exceeds a predetermined temperature threshold of a battery pack, then the battery pack is considered to be operating at a critical battery condition and may be at risk of overheating and experiencing a catastrophic failure. In one or more embodiments, critical event elements may include high shock/drop, overtemperature, undervoltage, overvoltage, high moisture, contactor welding, and the like. Additional disclosure related to a pack monitoring system can be found in U.S. patent application Ser. No. 17/529,583 entitled "A PACK MONITORING UNIT FOR AN ELECTRIC AIRCRAFT BATTERY PACK AND METHODS OF USE FOR BATTERY MANAGEMENT", entirety of which in incorporated herein by reference.

In one or more embodiments, controller 340 of PMU 328 and/or controller 112 may be configured to take corrective action if critical event element is determined by controller 340. For the purposes of this disclosure, a "corrective action" is a control signal generated by or given to, by pilot, to a controller that provides instructions related to reparative action needed to prevent and/or reduce damage to a battery back, components thereof, and/or aircraft as a result of a critical battery condition of the battery pack. Continuing the previously described example above, if an identified battery condition includes a temperature of 95° F., which exceeds a predetermined temperature threshold, then controller 340 may determine a critical event element indicating that battery pack 300 is working at a critical temperature level and at risk of catastrophic failure. In another nonlimiting example, if an identified battery condition includes a capacity measurement lower than predetermined discharge level, then controller 340 may determine that the battery pack 300 is fully discharged, as previously discussed in FIG. 1. In one or more embodiments, an overdischarging notification may be generated by controller 340 and/or controller 112 in response to receiving power data indicated power source 108 is fully discharged. As used in this disclosure, "overdischarging notification" is a notification that a power source is fully discharged. In an embodiment, the amount of electricity which has been discharged may be 1.5 to 2.0 times as great as the rated capacity of the battery. In one or more embodiments, overdischarging notification may be shown on a display of a computing device or interface of charging station and/or electric aircraft.

In one or more embodiments, controller 340 may include a computing device (as discussed in FIG. 11), controller 112 (as shown in FIG. 1), a central processing unit (CPU), a microprocessor, a digital signal processor (DSP), an application specific integrated circuit (ASIC), a control circuit, a combination thereof, or the like. In one or more embodiments, output signals from various components of battery pack 300 may be analog or digital. Controller 340 may convert output signals from MMU 324 and/or sensor 316 to a usable form by the destination of those signals. For example, and without limitation, PMU 328 may include a switching regulator that converts power received from battery module 304 of battery pack 300. The usable form of output signals from MMUs and/or sensors, through processor may be either digital, analog, a combination thereof, or an otherwise unstated form. Processing may be configured to trim, offset, or otherwise compensate the outputs of sensor. Based on MMU and/or sensor output, controller 340 may determine the output to send to a downstream component. Controller 340 may include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components. In one or more embodiments, PMU 328 may run state estimation algorithms.

Still referring to FIG. 3, battery management component 336 may include a high voltage disconnect 332 communicatively connected to battery module 304, wherein high voltage disconnect 332 is configured to terminate power supply connection 312 between battery module 304 and electric aircraft 308 in response to receiving an action command from PMU 328. For the purposes of this disclosure, an "action command" is a control signal generated by a controller that provides instructions related to reparative action needed to prevent and/or reduce damage to a battery back, components thereof, and/or aircraft as a result of a critical battery condition of the battery pack. PMU 328 may be configured to determine a critical event element, such as high shock/drop, overtemperature, undervoltage, contactor welding, and the like. High voltage disconnect 332 may be configured to receive action command generated by PMU 328 and thus lock out battery pack 300 for maintenance in response to received action command. In one or more embodiments, PMU 328 may create an alert, such as a lockout flag, which may be saved across reboots. A "lockout flag" may include an indicator alerting a user of a critical event element and subsequent termination of power supply connection 312 by high voltage disconnect 332. In one or more embodiments, a lockout flag may be saved in memory component 344 of PMU 328 so that, despite rebooting battery pack 300 or complete loss of power of battery pack 300, power supply connection remains terminated and an alert regarding the termination remains. In one or more embodiments, an alert and/or lockout flag may be transmitted to a user device for viewing. For example, and without limitation, an alert may be shown on a mobile device, a laptop, a tablet, a display of an electric aircraft user interface, or the like. In one or more embodiments, lockout flag cannot be removed until a critical event element is no longer determined by controller 340. For, example, PMU 328 may be continuously updating a battery condition and determining if battery condition is outside of a predetermined threshold. In one or more embodiments, lockout flag may include an alert on a graphic user interface of, for example, a remote computing device, such as a mobile device, tablet, laptop, desktop and the like. In other embodiments, lockout flag may be indicated to a user via an illuminated LED that is remote or locally located on battery pack 300. In one or more embodiments, PMU 328 may include control of cell group balancing via MMUs, control of contactors (high voltage connections, etc.) control of welding detection, control of pyro fuses, and the like.

In one or more embodiments, battery management component 336 may include a plurality of PMUs 328. For instance, and without limitation, battery management component 336 may include a pair of PMUs. For example, and without limitation, battery management component 336 may include a first PMU 328a and a second PMU 328b, which are each disposed in or on battery pack 300 and may be physically isolated from each other. "Physical isolation," for the purposes of this disclosure, refer to a first system's components, communicative connection, and any other constituent parts, whether software or hardware, are separated from a second system's components, communicative coupling, and any other constituent parts, whether software or hardware, respectively. Continuing in reference to the non-limiting exemplary embodiment, first PMU 328a and second PMU 328b may perform the same or different functions. For example, and without limitation, first and second PMUs 328a,b may perform the same, and therefore, redundant functions. Thus, if one PMU 328a/b fails or malfunctions, in whole or in part, the other PMU 328b/a may still be operating properly and therefore battery management component 336 may still operate and function properly to manage battery pack 300. One of ordinary skill in the art would understand that the terms "first" and "second" do not refer to either PMU as primary or secondary. In non-limiting embodiments, the first and second PMUs 328a,b, due to their physical isolation, may be configured to withstand malfunctions or failures in the other system and survive and operate. Provisions may be made to shield first PMU 328a from second PMU 328b other than physical location, such as structures and circuit fuses. In non-limiting embodiments, first PMU 328a, second PMU 328b, or subcomponents thereof may be disposed on an internal component or set of components within battery pack 300, such as on a battery module sense board, as discussed further below in this disclosure.

Still referring to FIG. 3, first PMU 328a may be electrically isolated from second PMU 328b. "Electrical isolation", for the purposes of this disclosure, refer to a first system's separation of components carrying electrical signals or electrical energy from a second system's components. First PMU 328a may suffer an electrical catastrophe, rendering it inoperable, and due to electrical isolation, second PMU 328b may still continue to operate and function normally, allowing for continued management of battery pack 300 of electric aircraft 308. Shielding such as structural components, material selection, a combination thereof, or another undisclosed method of electrical isolation and insulation may be used, in non-limiting embodiments. For example, and without limitation, a rubber or other electrically insulating material component may be disposed between electrical components of first and second PMUs 328a, b, preventing electrical energy to be conducted through it, isolating the first and second PMUs 328a,b form each other. Similarly, MMUs 324 may be physically and/or electrically isolated relative to each other and/or PMUs in case of failure of an MMU and/or PMU.

With continued reference to FIG. 3, battery management component 336 may include a memory component 344. In one or more embodiments, memory component 344 may be configured to store metrics and/or power data, such as discharge metrics, associated with battery pack 300, such as data related to battery modules 304a-n. Memory component 344 may include a database, such as a corrective action database. Memory component 344 may include a solid-state memory or tape hard drive. Memory component 344 may be communicatively connected to PMU 328 and may be configured to receive electrical signals related to physical or electrical phenomenon measured and store those electrical signals as battery module data. Alternatively, memory component 344 may be a plurality of discrete memory components that are physically and electrically isolated from each other. One of ordinary skill in the art would understand the virtually limitless arrangements of data stores with which battery pack 300 could employ to store battery pack data.

Figure 4:
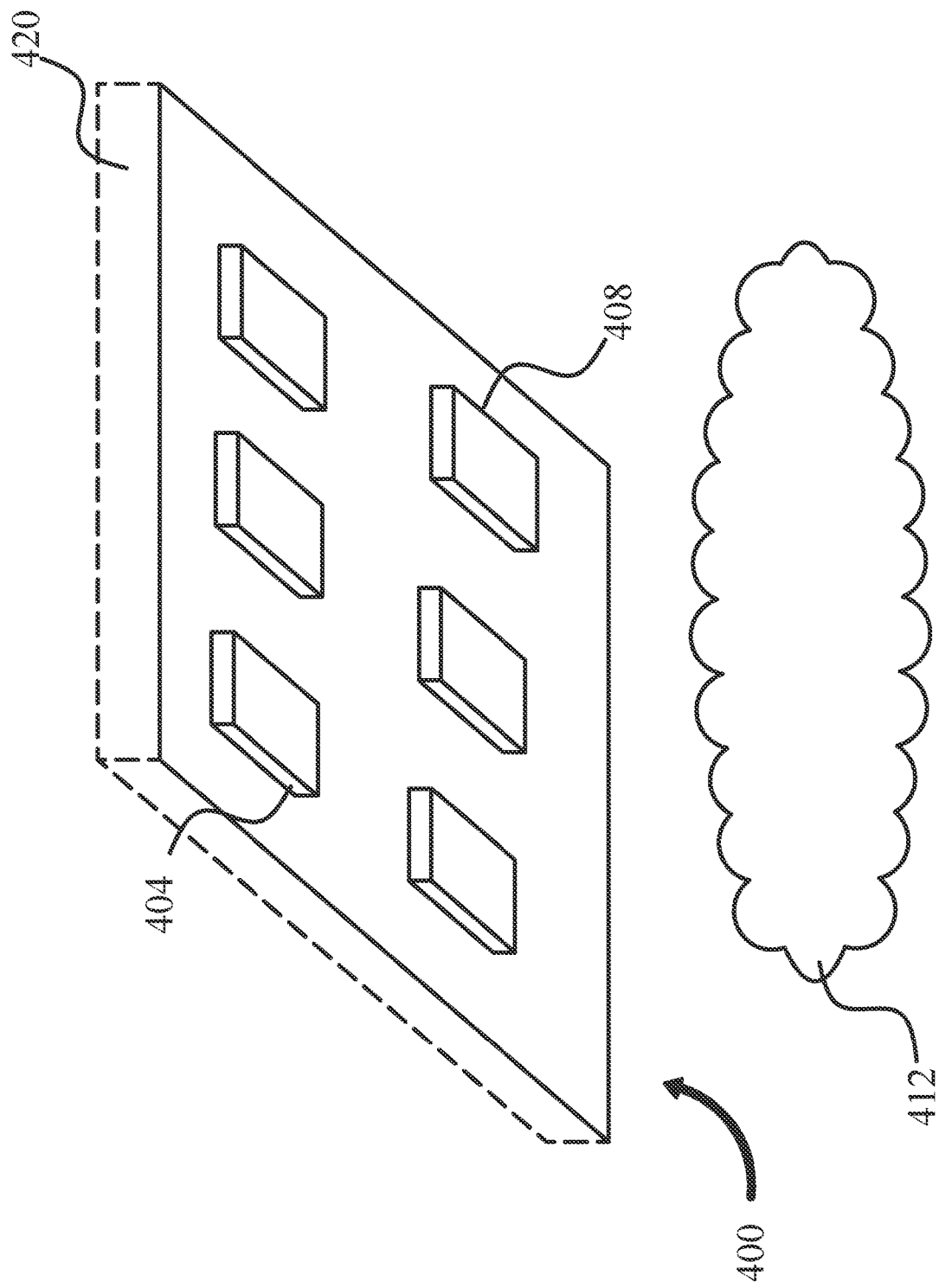
FIG. 4 is an illustration of an exemplary embodiment of a sensor suite in partial cut-off view in one or more aspects of the present disclosure.

Referring now to FIG. 4, an embodiment of sensor suite 400 is presented. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack 300 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of battery battery pack 300 and/or user to detect phenomenon is maintained and in a non-limiting example, a user alter aircraft usage pursuant to sensor readings.

Sensor suite 400 may be suitable for use as sensor 316 as disclosed with reference to FIG. 3 hereinabove. Sensor suite 400 may include a moisture sensor 404. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. Moisture sensor 404 may be psychrometer. Moisture sensor 404 may be a hygrometer.

Moisture sensor 404 may be configured to act as or include a humidistat. A "humidistat," for the purposes of this disclosure, is a humidity-triggered switch, often used to control another electronic device. Moisture sensor 404 may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 4, sensor suite 400 may include electrical sensors 408. Electrical sensors 408 may be configured to measure voltage across a component, electrical current through a component, and resistance of a component. Electrical sensors 408 may include separate sensors to measure each of the previously disclosed electrical characteristics such as voltmeter, ammeter, and ohmmeter, respectively.

Alternatively or additionally, and with continued reference to FIG. 4, sensor suite 400 include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 400 and/or a control circuit incorporated therein and/or communicatively connected thereto may be configured to adjust charge to one or more battery cells as a function of a charge level and/or a detected parameter. For instance, and without limitation, sensor suite 400 may be configured to determine that a charge level of a battery cell is high based on a detected voltage level of that battery cell or portion of the battery pack. Sensor suite 400 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 400 may include digital sensors, analog sensors, or a combination thereof. Sensor suite 400 may include digital-to-analog converters (DAC), analog-to-digital converters (ADC, A/D, A-to-D), a combination thereof, or other signal conditioning components used in transmission of a first plurality of battery pack data to a destination over wireless or wired connection.

With continued reference to FIG. 4, sensor suite 400 may include thermocouples, thermistors, thermometers, passive infrared sensors, resistance temperature sensors (RTDs), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 400, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 4, sensor suite 400 may include a sensor configured to detect gas that may be emitted during or after a cell failure. "Cell failure," for the purposes of this disclosure, refers to a malfunction of a battery cell, which may be an electrochemical cell, which renders the cell inoperable for its designed function, namely providing electrical energy to at least a portion of an electric aircraft. Byproducts 412 of cell failure may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 400, may be configured to detect combustible, flammable, toxic, oxygen depleted, a combination thereof, or another type of gas alone or in combination. The gas sensor that may be present in sensor suite 400 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 400 may include sensors that are configured to detect non-gaseous byproducts 412 of cell failure including, in non-limiting examples, liquid chemical leaks including aqueous alkaline solution, ionomer, molten phosphoric acid, liquid electrolytes with redox shuttle and ionomer, and salt water, among others. Sensor suite 400 may include sensors that are configured to detect non-gaseous byproducts 412 of cell failure including, in non-limiting examples, electrical anomalies as detected by any of the previous disclosed sensors or components.

With continued reference to FIG. 4, sensor suite 400 may be configured to detect events where voltage nears an upper voltage threshold or lower voltage threshold. The upper voltage threshold may be stored in memory component 344 for comparison with an instant measurement taken by any combination of sensors present within sensor suite 400. The upper voltage threshold may be calculated and calibrated based on factors relating to battery cell health, maintenance history, location within battery pack, designed application, and type, among others. Sensor suite 400 may measure voltage at an instant, over a period of time, or periodically. Sensor suite 400 may be configured to operate at any of these detection modes, switch between modes, or simultaneous measure in more than one mode. Sensor suite 400 is configured to determine an overvoltage of the battery pack. As used herein, "overvoltage" is when the voltage across the battery cell is sustained at a higher than threshold value. In one or more exemplary embodiments, PMU 328 may determine, using sensor suite 400, a critical event element where voltage nears the lower voltage threshold. The lower voltage threshold may indicate power loss to or from an individual battery cell or portion of the battery pack. Sensor suite 400 is configured to determine an undervoltage of the battery pack. As used herein, "undervoltage" is when the voltage across the battery cell falls below its minimum operating value, typically around 2.5V. Overdischarge may occur in an undervoltage event. This may case the battery cell to short. PMU 328 may determine through sensor suite 400 critical event elements where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

In one or more embodiments, sensor suite 400 may include an inertial measurement unit (IMU). In one or more embodiments, an IMU may be configured to detect a change in specific force of a body. An IMU may include an accelerometer, a gyro sensor, a magnetometer, an E-compass, a G-sensor, a geomagnetic sensor, and the like. An IMU may be configured to obtain measurement datum. PMU 328 may determine a critical event element by if, for example, an accelerometer of sensor suite 400 detects a force experienced by battery pack 300 that exceeds a predetermined threshold.

In one or more embodiments, high voltage disconnect may include a bus. A "bus," for the purposes of this disclosure and in electrical parlance is any common connection to which any number of loads, which may be connected in parallel, and share a relatively similar voltage may be electrically coupled. Bus may be responsible for conveying electrical energy stored in battery pack 300 to at least a portion of an electric aircraft, as discussed previously in this disclosure. High voltage disconnect 332 may include a ground fault detection, a high voltage current sense, a high voltage pyro fuse, a high voltage contactor, and the like. High voltage disconnect 332 may physically and/or electrically breaks power supply communication between electric aircraft 308 and battery module 304 of battery pack 300. In one or more embodiments, in one or more embodiments, the termination of power supply connection 312 may be restored by high voltage disconnect 332 once PMU 328 no longer determine a critical event element. In other embodiments, power supply connection 312 may be restored manually, such as by a pilot.

In one or more embodiments, controller 340 may conduct reparative procedures after determining critical even element to reduce or eliminate critical element event. For example, and without limitation, controller 340 may initiate reparative procedure of a circulation of a coolant through a cooling system of battery pack 300 to lower a temperature of a battery module if the determined temperature of the battery module exceeds a predetermined temperature threshold. In another example, and without limitation, if a fluid accumulation level is detected that is then determined to exceed a predetermined byproduct threshold, then high voltage disconnect 332 may terminate power supply connection 312. According to some embodiments, a vent of battery pack 300 may be opened to circulate air through battery pack 300 and reduce detected gas levels. Additionally, vent of battery module 304 may have a vacuum applied to aid in venting of a byproduct, such as ejecta. Vacuum pressure differential may range from 0.1"Hg to 36"Hg.

Referring back to FIG. 3, the system 300 comprises a display 348 that is communicatively connected to the battery management component, wherein the display 348 is configured to provide a notification as a function of the battery condition. As used in this disclosure, a "notification" is an alert or message sent to the display 348 to show the pilot a critical event. A notification may provide alerts in various forms, not limited to, an audio alert, a visual alert, a video alert, a tactile alert, a textual alert, or the like. Display 348 shows an overdischarging notification to the pilot. The display 348 may also show any other critical events related to the battery condition, as discussed above. Notification may also contain details of the battery condition and an option for pilot input, as discussed above. Pilot may select a corrective action from a database of corrective actions to address the notification. Display 348 also shows the threshold of the discharge metric. This may communicate whether a high or low threshold of the discharge metric is reached. For example, an overvoltage or undervoltage of a battery cell in relation to the voltage threshold. Threshold of the discharge metric may be displayed with different colored lights, such as red for critical, and green for normal.

In one or more embodiments, display 348 may include a separate device that includes a transparent screen configured to display computer generated images and/or information. As used in this disclosure, a "display" is an image-generating device for the visual representation of at least a datum. In a nonlimiting example, image-generating device may include augmented reality device, various analog devices (e.g., cathode-ray tube, etc.), and digital devices (e.g., liquid crystal, active-matrix plasma, etc.). An "augmented reality" device, as used in this disclosure, is a device that permits a user to view a typical field of vision of the user and superimposes virtual images on the field of vision. Augmented reality device may be implemented in any suitable way, including without limitation incorporation of or in a head mounted display, a head-up display, a display incorporated in eyeglasses, googles, headsets, helmet display systems, or the like, a display incorporated in contact lenses, an eye tap display system including without limitation a laser eye tap device, VRD, or the like. In a non-limiting embodiment, the display 348 may be placed in front of the pilot wherein the pilot may view the information displayed. In a non-limiting embodiment, the display 348 may be placed between the pilot and the central point of the exterior view window, wherein the exterior view window is configured to provide visibility of the outside environment while the display 348 is configured to display information, wherein the information is related to the outside environment. The pilot may view the information and the outside environment with minimal bodily movement of the head of the pilot. The display 348 may include a plurality of lines, images, symbols, etc. The lines, images, and symbols may be used to denote the current position, direction, location, state of charge etc., of the electric aircraft. The display 348 may further display information describing the aircraft and its functionalities in real-time. The display 348 may include alternative information related to communication. The display 348 may include one or more projection devices within the display and/or screen of the display 348 to display the flight information. Persons skilled in the art, upon reviewing the entirety of this disclosure, will be aware of the various embodiments various flight information may be displayed and placed on the display for purposes as described herein. Additional disclosure related to flight displays can be found in U.S. patent application Ser. No. 37/575,066 entitled "A SYSTEM FOR ESTABLISHING A PRIMARY FLIGHT DISPLAY IN AN ELECTRICAL VERTICAL TAKEOFF AND LANDING AIRCRAFT," entirety of which incorporated herein by reference.

Figure 5A:
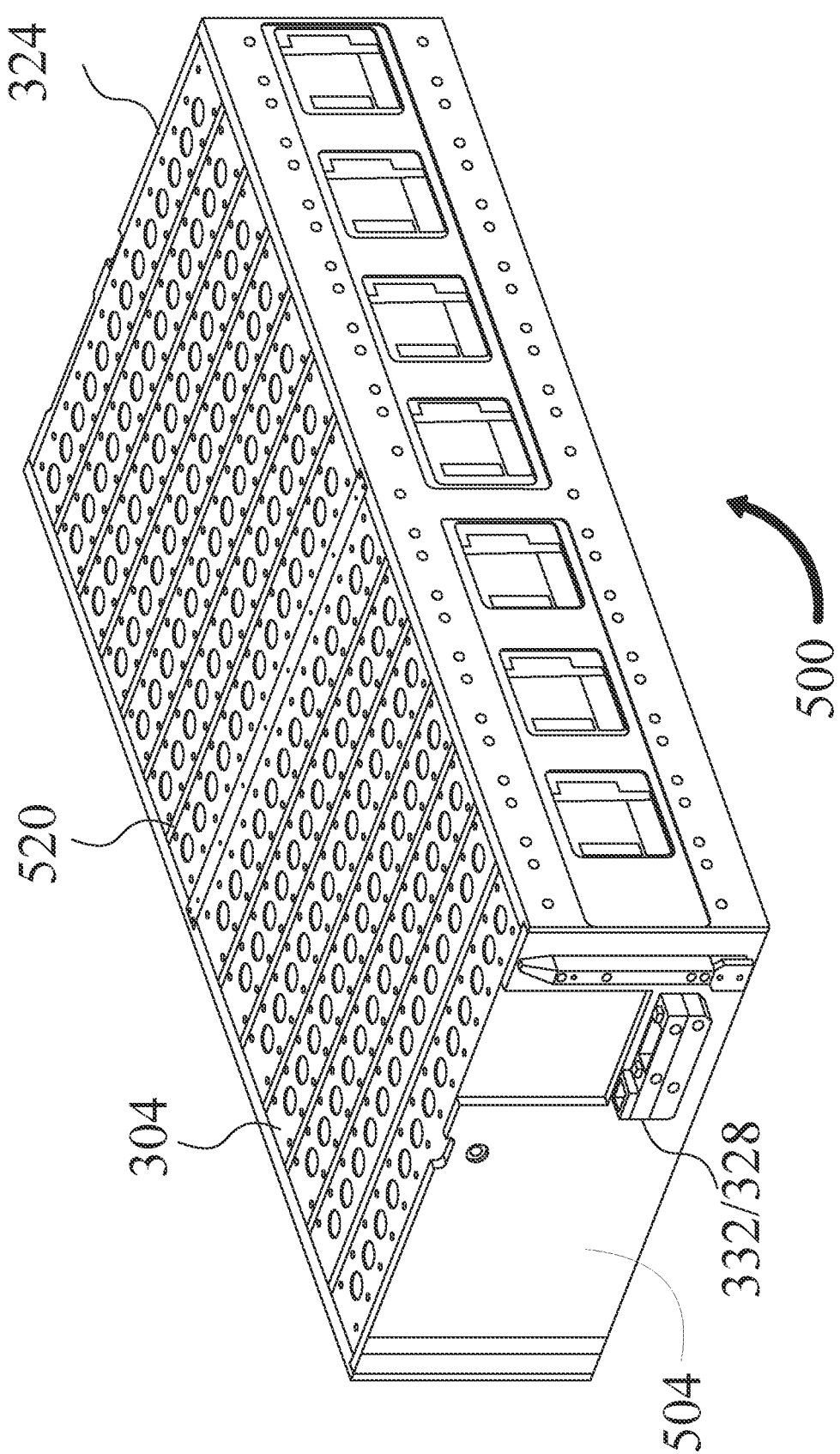
FIGS. 5A and 5B are illustrations of exemplary embodiments of battery pack configured for use in an electric aircraft in isometric view in accordance with one or more aspects of the present disclosure.
Figure 5B:
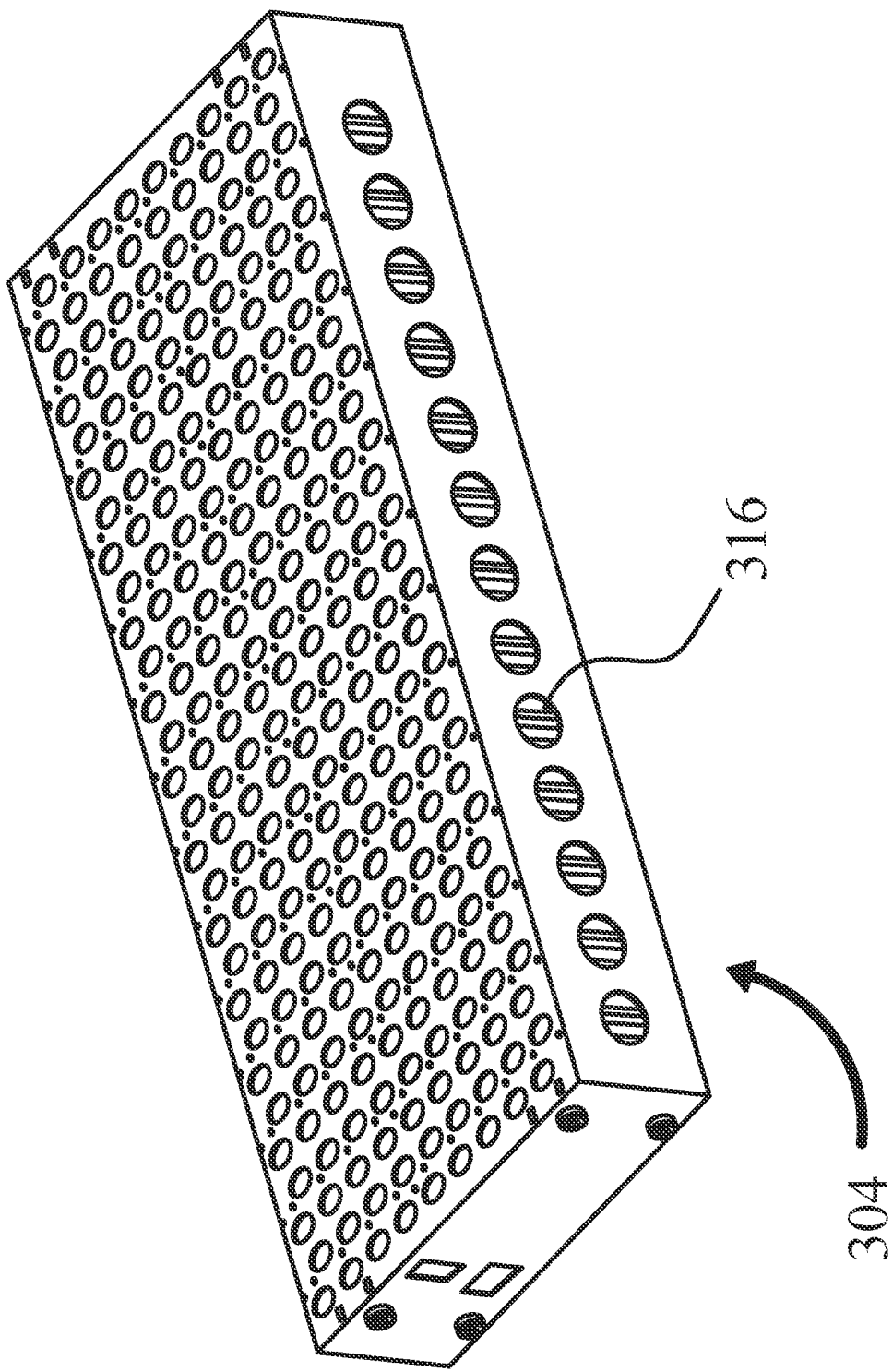

Now referring to FIGS. 5A and 5B, an exemplary embodiment of an electric aircraft power source is illustrated. Power source may include a battery pack, such as battery pack 500 is a power source that may be configured to store electrical energy in the form of a plurality of battery modules, which themselves include of a plurality of electrochemical cells. These cells may utilize electrochemical cells, galvanic cells, electrolytic cells, fuel cells, flow cells, pouch cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term "battery" is used as a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term "wired," but one of ordinary skill in the art would appreciate that this term is synonymous with "electrically connected," and that there are many ways to couple electrical elements like battery cells together. An example of a connector that does not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, and without limitation, battery pack 500 include 196 battery cells in series and 18 battery cells in parallel. This is, as someone of ordinary skill in the art would appreciate, is only an example and battery pack 500 may be configured to have a near limitless arrangement of battery cell configurations. Battery pack 500 may be designed to the Federal Aviation Administration (FAA)'s Design Assurance Level A (DAL-A), using redundant DAL-B subsystems.

With continued reference to FIGS. 5A and 5B, battery pack 500 may include a plurality of battery modules 504. Battery modules 504 may be wired together in series and in parallel. Battery pack 500 may include a center sheet which may include a thin barrier. The barrier may include a fuse connecting battery modules on either side of the center sheet. The fuse may be disposed in or on the center sheet and configured to connect to an electric circuit comprising a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may include a thermal fuse, mechanical fuse, blade fuse, expulsion fuse, spark gap surge arrestor, varistor, or a combination thereof.

Battery pack 500 may also include a side wall includes a laminate of a plurality of layers configured to thermally insulate the plurality of battery modules from external components of battery pack 500. The side wall layers may include materials which possess characteristics suitable for thermal insulation as described in the entirety of this disclosure like fiberglass, air, iron fibers, polystyrene foam, and thin plastic films, to name a few. The side wall may additionally or alternatively electrically insulate the plurality of battery modules from external components of battery pack 500 and the layers of which may include polyvinyl chloride (PVC), glass, asbestos, rigid laminate, varnish, resin, paper, Teflon, rubber, and mechanical lamina. The center sheet may be mechanically coupled to the side wall in any manner described in the entirety of this disclosure or otherwise undisclosed methods, alone or in combination. The side wall may include a feature for alignment and coupling to the center sheet. This feature may include a cutout, slots, holes, bosses, ridges, channels, and/or other undisclosed mechanical features, alone or in combination.

With continued reference to FIGS. 5A and 5B, battery pack 500 may also include an end panel 504 including a plurality of electrical connectors and further configured to fix battery pack 500 in alignment with at least the side wall. End panel 504 may include a plurality of electrical connectors of a first gender configured to electrically and mechanically connect to electrical connectors of a second gender. The end panel may be configured to convey electrical energy from battery cells to at least a portion of an eVTOL aircraft, for example, using high voltage disconnect 332. Electrical energy may be configured to power at least a portion of an eVTOL aircraft or include signals to notify aircraft computers, personnel, users, pilots, and any others of information regarding battery health, emergencies, and/or electrical characteristics. The plurality of electrical connectors may include blind mate connectors, plug and socket connectors, screw terminals, ring and spade connectors, blade connectors, and/or an undisclosed type alone or in combination. The electrical connectors of which the end panel includes may be configured for power and communication purposes. A first end of the end panel may be configured to mechanically couple to a first end of a first side wall by a snap attachment mechanism, similar to end cap and side panel configuration utilized in the battery module. To reiterate, a protrusion disposed in or on the end panel may be captured, at least in part, by a receptacle disposed in or on the side wall. A second end of end the panel may be mechanically coupled to a second end of a second side wall in a similar or the same mechanism.

With continued reference to FIGS. 5A and 5B, sensor suite 400 may be disposed in or on a portion of battery pack 500 near battery modules or battery cells. In one or more embodiments, PMU 328 may be configured to communicate with an electric aircraft, such as a flight controller of electric aircraft 104, using a controller area network (CAN), such as by using a CAN transceiver 424 as shown in FIG. 5. In one or more embodiments, a controller area network may include a bus. Bus may include an electrical bus. Bus may refer to power busses, audio busses, video busses, computing address busses, and/or data busses. Bus may be additionally or alternatively responsible for conveying electrical signals generated by any number of components within battery pack 500 to any destination on or offboard an electric aircraft. Battery management component 336 may include wiring or conductive surfaces only in portions required to electrically couple bus to electrical power or necessary circuits to convey that power or signals to their destinations.

Outputs from sensors or any other component present within system may be analog or digital. Onboard or remotely located processors can convert those output signals from sensor suite to a usable form by the destination of those signals. The usable form of output signals from sensors, through processor may be either digital, analog, a combination thereof or an otherwise unstated form. Processing may be configured to trim, offset, or otherwise compensate the outputs of sensor suite. Based on sensor output, the processor can determine the output to send to downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components.

With continued reference to FIGS. 5A and 5B, any of the disclosed components or systems, namely battery pack 500, PMU 328, and/or battery cell may incorporate provisions to dissipate heat energy present due to electrical resistance in integral circuit. Battery pack 500 includes one or more battery element modules wired in series and/or parallel. The presence of a voltage difference and associated amperage inevitably will increase heat energy present in and around battery pack 500 as a whole. The presence of heat energy in a power system is potentially dangerous by introducing energy possibly sufficient to damage mechanical, electrical, and/or other systems present in at least a portion of an electric aircraft. Battery pack 500 may include mechanical design elements, one of ordinary skill in the art, may thermodynamically dissipate heat energy away from battery pack 500. The mechanical design may include, but is not limited to, slots, fins, heat sinks, perforations, a combination thereof, or another undisclosed element.

Heat dissipation may include material selection beneficial to move heat energy in a suitable manner for operation of battery pack 500. Certain materials with specific atomic structures and therefore specific elemental or alloyed properties and characteristics may be selected in construction of battery pack 500 to transfer heat energy out of a vulnerable location or selected to withstand certain levels of heat energy output that may potentially damage an otherwise unprotected component. One of ordinary skill in the art, after reading the entirety of this disclosure would understand that material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof. Heat dissipation may include a combination of mechanical design and material selection. The responsibility of heat dissipation may fall upon the material selection and design as disclosed above in regard to any component disclosed in this paper. The battery pack 500 may include similar or identical features and materials ascribed to battery pack 500 in order to manage the heat energy produced by these systems and components.

According to embodiments, the circuitry disposed within or on battery pack 500 may be shielded from electromagnetic interference. The battery elements and associated circuitry may be shielded by material such as mylar, aluminum, copper a combination thereof, or another suitable material. The battery pack 500 and associated circuitry may include one or more of the aforementioned materials in their inherent construction or additionally added after manufacture for the express purpose of shielding a vulnerable component. The battery pack 500 and associated circuitry may alternatively or additionally be shielded by location. Electrochemical interference shielding by location includes a design configured to separate a potentially vulnerable component from energy that may compromise the function of said component. The location of vulnerable component may be a physical uninterrupted distance away from an interfering energy source, or location configured to include a shielding element between energy source and target component. The shielding may include an aforementioned material in this section, a mechanical design configured to dissipate the interfering energy, and/or a combination thereof. The shielding comprising material, location and additional shielding elements may defend a vulnerable component from one or more types of energy at a single time and instance or include separate shielding for individual potentially interfering energies.

Figure 6:
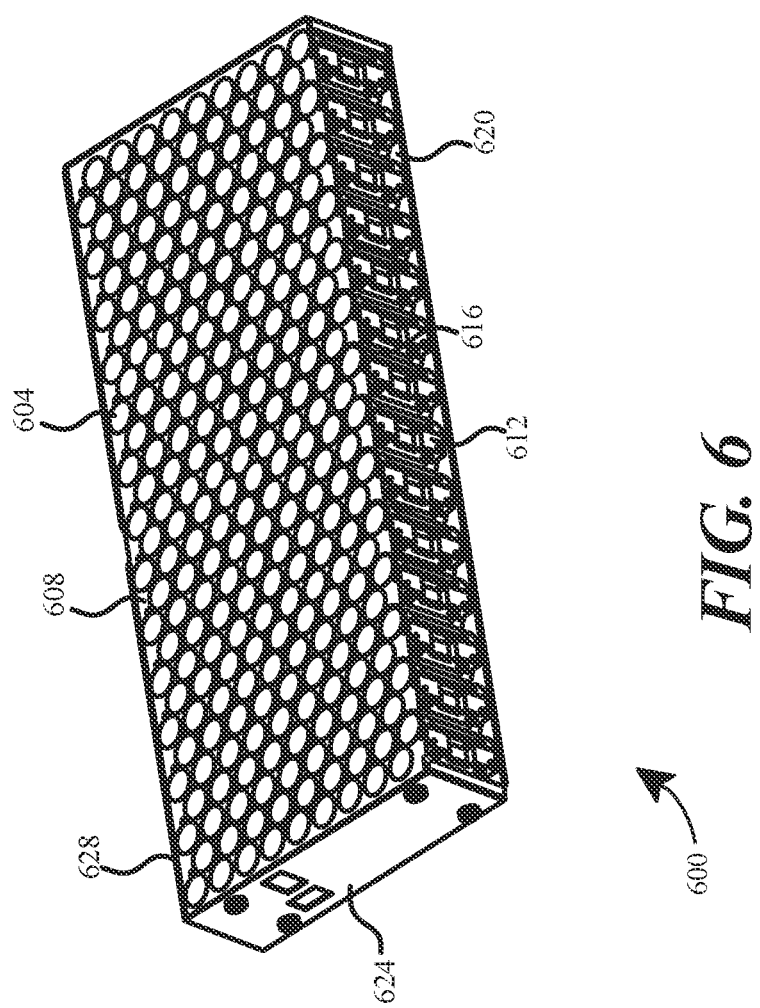
FIG. 6 is a schematic of an exemplary battery module in accordance with one or more aspects of the present disclosure.

Referring now to FIG. 6, an exemplary energy source is shown in accordance with one or more embodiments of the present disclosure. Battery module 600 with multiple battery units 616 is shown. Battery module 600 may comprise a battery cell 604, cell retainer 608, cell guide 612, protective wrapping, back plate 620, end cap 624, and side panel 628. Battery module 600 may comprise a plurality of battery cells, an individual of which is labeled 604. In embodiments, battery cells 604 may be disposed and/or arranged within a respective battery unit 616 in groupings of any number of columns and rows. For example, in the illustrative embodiment of FIG. 6, battery cells 604 are arranged in each respective battery unit 616 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 6 battery cells 604 are arranged 18 to battery unit 616 with a plurality of battery units 616 comprising battery module 600, one of skill in the art will understand that battery cells 604 may be arranged in any number to a row and in any number of columns and further, any number of battery units may be present in battery module 600. According to embodiments, battery cells 604 within a first column may be disposed and/or arranged such that they are staggered relative to battery cells 604 within a second column. In this way, any two adjacent rows of battery cells 604 may not be laterally adjacent but instead may be respectively offset a predetermined distance. In embodiments, any two adjacent rows of battery cells 604 may be offset by a distance equal to a radius of a battery cell. This arrangement of battery cells 604 is only a non-limiting example and in no way preclude other arrangement of battery cells.

In embodiments, battery cells 604 may be fixed in position by cell retainer 608. For the illustrative purposed within FIG. 6, cell retainer 608 is depicted as the negative space between the circles representing battery cells 604. Cell retainer 608 comprises a sheet further comprising circular openings that correspond to the cross-sectional area of an individual battery cell 604. Cell retainer 608 comprises an arrangement of openings that inform the arrangement of battery cells 604. In embodiments, cell retainer 608 may be configured to non-permanently, mechanically couple to a first end of battery cell 604.

According to embodiments, battery module 600 may further comprise a plurality of cell guides 612 corresponding to each battery unit 616. Cell guide 612 may comprise a solid extrusion with cutouts (e.g., scalloped) corresponding to the radius of the cylindrical battery cell 604. Cell guide 612 may be positioned between the two columns of a battery unit 616 such that it forms a surface (e.g., side surface) of the battery unit 616. In embodiments, the number of cell guides 612 therefore match in quantity to the number of battery units 616. Cell guide 612 may comprise a material suitable for conducting heat.

Battery module 600 may also comprise a protective wrapping woven between the plurality of battery cells 604. Protective wrapping may provide fire protection, thermal containment, and thermal runaway during a battery cell malfunction or within normal operating limits of one or more battery cells 604 and/or potentially, battery module 600 as a whole. Battery module 600 may also comprise a back plate 620. Back plate 620 is configured to provide structure and encapsulate at least a portion of battery cells 604, cell retainers 608, cell guides 612, and protective wraps. End cap 624 may be configured to encapsulate at least a portion of battery cells 604, cell retainers 608, cell guides 612, and battery units 616, as will be discussed further below, end cap may comprise a protruding boss that clicks into receivers in both ends of back plate 620, as well as a similar boss on a second end that clicks into sense board. Side panel 628 may provide another structural element with two opposite and opposing faces and further configured to encapsulate at least a portion of battery cells 604, cell retainers 608, cell guides 612, and battery units 616.

Still referring to FIG. 6, in embodiments, battery module 600 can include one or more battery cells 604. In another embodiment, battery module 600 comprises a plurality of individual battery cells 604. Battery cells 604 may each comprise a cell configured to include an electrochemical reaction that produces electrical energy sufficient to power at least a portion of an electric aircraft. Battery cell 604 may include electrochemical cells, galvanic cells, electrolytic cells, fuel cells, flow cells, voltaic cells, or any combination thereof—to name a few. In embodiments, battery cells 604 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 604 may use the term "wired", but one of ordinary skill in the art would appreciate that this term is synonymous with "electrically connected", and that there are many ways to couple electrical elements like battery cells 604 together. As an example, battery cells 604 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 604 may be wired in a series-parallel circuit which combines characteristics of the constituent circuit types to this combination circuit. Battery cells 604 may be electrically connected in any arrangement which may confer onto the system the electrical advantages associated with that arrangement such as high-voltage applications, high-current applications, or the like.

As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

According to embodiments, battery module 600 may also comprise back plate 620. Back plate 620 is configured to provide a base structure for battery module 600 and may encapsulate at least a portion thereof. Back plate 620 can have any shape and includes opposite, opposing sides with a thickness between them. In embodiments, back plate 620 may comprise an effectively flat, rectangular prism shaped sheet. For example, back plate 620 can comprise one side of a larger rectangular prism which characterizes the shape of battery module 600 as a whole. Back plate 620 also comprises openings correlating to each battery cell 604 of the plurality of battery cells 604. Back plate 620 may comprise a lamination of multiple layers. The layers that are laminated together may comprise FR-4, a glass-reinforced epoxy laminate material, and a thermal barrier of a similar or exact same type as disclosed hereinabove. Back plate 620 may be configured to provide structural support and containment of at least a portion of battery module 600 as well as provide fire and thermal protection.

According to embodiments, battery module 600 may also comprise first end cap 624 configured to encapsulate at least a portion of battery module 600. End cap 624 may provide structural support for battery module 600 and hold back plate 620 in a fixed relative position compared to the overall battery module 600. End cap 624 may comprise a protruding boss on a first end that mates up with and snaps into a receiving feature on a first end of back plate 620. End cap 624 may comprise a second protruding boss on a second end that mates up with and snaps into a receiving feature on sense board, which may include sensor suite 400.

Battery module 600 may also comprise at least a side panel 628 that may encapsulate two sides of battery module 600. Side panel 628 may comprise opposite and opposing faces comprising a metal or composite material. In the illustrative embodiment of FIG. 6, a second side panel 628 is present but not illustrated so that the inside of battery module 600 may be presented. Side panel(s) 628 may provide structural support for battery module 600 and provide a barrier to separate battery module 600 from exterior components within aircraft or environment.

Figure 7:
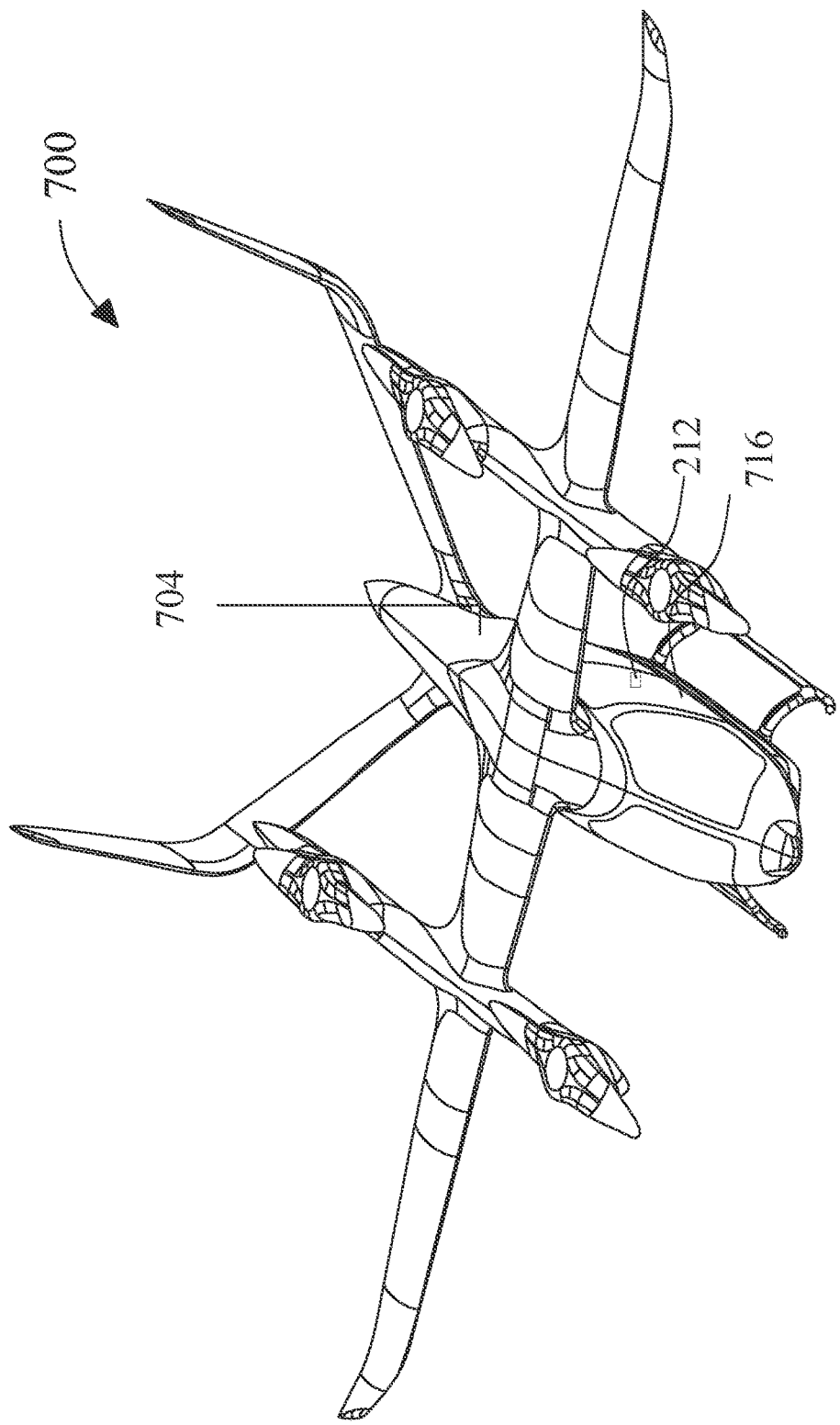
FIG. 7 is a schematic of an exemplary electric aircraft in accordance with one or more aspects of the present disclosure.

Referring now to FIG. 7, an exemplary embodiment of an electric aircraft 700 is illustrated. Aircraft 700 may include an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 7, aircraft 700 may include a fuselage 704. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 704 may comprise structural elements that physically support the shape and structure of an aircraft. Structural elements may take a plurality of forms, alone or in combination with other types. Structural elements may vary depending on the construction type of aircraft and specifically, the fuselage. Fuselage 704 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper. In one or more embodiments, electric aircraft 500 includes port 212. In one or more embodiments port 212 may be disposed within fuselage 704.

Still referring to FIG. 7, port 212 may be electrically connected to an energy source. An energy source may include, for example, a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

Still referring to FIG. 7, aircraft 700 may include a sensor 716. Sensor 716 may include any sensor or noise monitoring circuit. Sensor may be configured to sense a characteristic of charging connection or condition and/or parameter of a power source of electric aircraft 700. Sensor may be a device, module, and/or subsystem, utilizing any hardware, software, and/or any combination thereof to sense a characteristic and/or changes thereof, in an instant environment, for instance without limitation controller, which the sensor is proximal to or otherwise in a sensed communication with, and transmit information associated with the characteristic, for instance without limitation digitized data. Sensor may be mechanically and/or communicatively connected to aircraft 700. In other embodiments, sensor may be communicatively connected to charging station 116. Sensor may be configured to sense a characteristic associated with a power source of electric aircraft, such as a critical condition (e.g., overheating, overcurrent, gas detection, cell failure byproduct detection, moisture detection, and the like) and may transmit a control signal to controller 112 to terminate charging connection. Sensor may include one or more proximity sensors, position sensor, displacement sensors, vibration sensors, photoelectric sensors, infrared sensors, pressure sensor, electrical sensors, such as voltmeters and current sensors, moisture, sensors, chemical sensors, gas sensors, and the like. Sensor may be used to monitor the status of aircraft 700 for both critical and non-critical functions. Sensor may be incorporated into vehicle or aircraft or be remote.

In some cases, sensor 716 may sense a characteristic as an analog measurement, for instance, yielding a continuously variable electrical potential indicative of the sensed characteristic. In these cases, sensor 716 may additionally comprise an analog to digital converter (ADC) as well as any additionally circuitry, such as without limitation a Whetstone bridge, an amplifier, a filter, and the like. In one or more embodiments, sensor 716 may sense a characteristic through a digital means or digitize a sensed signal natively.

Still referring to FIG. 7, electric aircraft 700 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Figure 8:
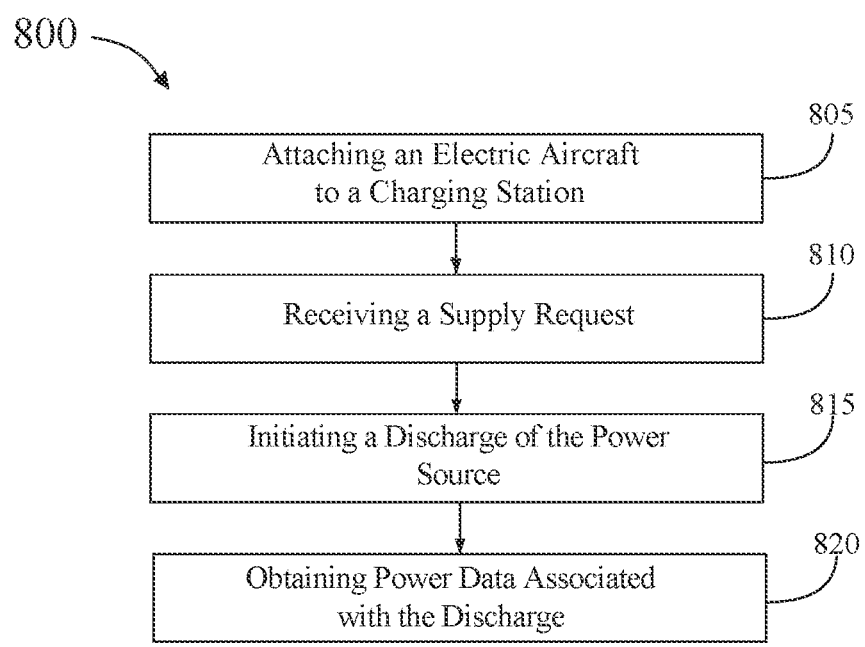
FIG. 8 is a flow chart showing an exemplary embodiment of a method of providing power to an electric aircraft or a power grid in accordance with one or more aspects of the present disclosure.

Referring now to FIG. 8, a flow chart of an exemplary embodiment of a method 800 for discharging power source 108 of electric aircraft 104 is shown. As shown in step 805, method 800 includes removably attaching electric aircraft 104 to charging station 116 to create a charging connection between power source and charging station, as discussed previously in this disclosure. These steps may be implemented as described above, without limitation, in FIGS. 1-7.

As shown in step 810, method 800 includes receiving, by controller 112 of the electric aircraft 104, a supply request to discharge power source 108. In some embodiments, supply request may be received from a user such as, for example, via a remote device of a user or a display of a cockpit system. These steps may be implemented as described above, without limitation, in FIGS. 1-7.

As shown in step 815, method 800 includes initiating, by the controller, a discharge of the power source via the charging connection, wherein discharging the power source comprises a current depth of discharge of the power source exceeding predetermined discharge level. In one or more embodiments, method 300 further includes detecting, by an electrical sensor communicatively connected to the charging connection, a current of the charging connection. In various embodiments, the predetermined discharge level comprises a range of 80% to 95% depth of discharge of the power source. In various embodiments, the predetermined discharge level comprises a range of 80% to 95% depth of discharge of the power source. These steps may be implemented as described above, without limitation, in FIGS. 1-7.

As show in step 820, method 800 includes obtaining power data associated with the discharge of power source 108. In various embodiments, the power data includes a discharge metric that includes a current state of charge of the power source. In some embodiments, system 100 further includes a state of charge sensor communicatively connected to the controller and the power source, where the state of charge sensor is configured to detect the current state of charge of the power source. In various embodiments, the power source may include battery management component, which is attached to the power source, where the battery management component is configured to monitor and regulate a temperature of the power source as a function of the power data. In various embodiments, power data comprises a discharge metric that comprises a current temperature of the power source. These steps may be implemented as described above, without limitation, in FIGS. 1-7.

Figure 9:
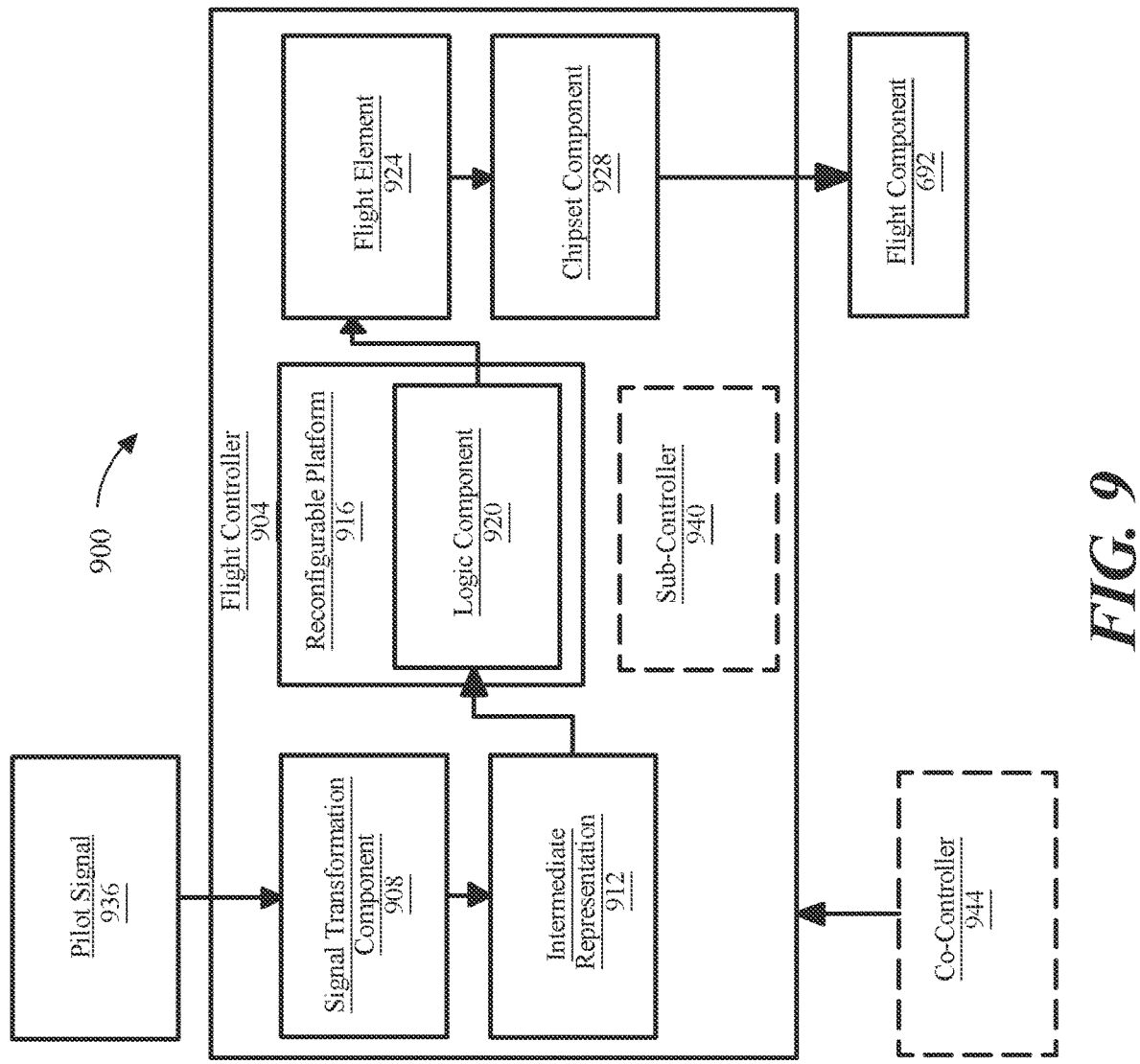
FIG. 9 is a block diagram depicting an exemplary flight controller in accordance with one or more aspects of the present disclosure.

Now referring to FIG. 9, an exemplary embodiment 900 of a flight controller 904 is illustrated. As used in this disclosure a "flight controller" is a computing device of a plurality of computing devices dedicated to data storage, security, distribution of traffic for load balancing, and flight instruction. Flight controller 904 may include and/or communicate with any computing device as described in this disclosure, including without limitation a microcontroller, microprocessor, digital signal processor (DSP) and/or system on a chip (SoC) as described in this disclosure. Further, flight controller 904 may include a single computing device operating independently, or may include two or more computing device operating in concert, in parallel, sequentially or the like; two or more computing devices may be included together in a single computing device or in two or more computing devices. In embodiments, flight controller 904 may be installed in an aircraft, may control the aircraft remotely, and/or may include an element installed in the aircraft and a remote element in communication therewith.

In an embodiment, and still referring to FIG. 9, flight controller 904 may include a signal transformation component 908. As used in this disclosure a "signal transformation component" is a component that transforms and/or converts a first signal to a second signal, wherein a signal may include one or more digital and/or analog signals. For example, and without limitation, signal transformation component 908 may be configured to perform one or more operations such as preprocessing, lexical analysis, parsing, semantic analysis, and the like thereof. In an embodiment, and without limitation, signal transformation component 908 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 908 may include transforming one or more low-level languages such as, but not limited to, machine languages and/or assembly languages. For example, and without limitation, signal transformation component 908 may include transforming a binary language signal to an assembly language signal. In an embodiment, and without limitation, signal transformation component 908 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 9, signal transformation component 908 may be configured to optimize an intermediate representation 912. As used in this disclosure an "intermediate representation" is a data structure and/or code that represents the input signal. Signal transformation component 908 may optimize intermediate representation as a function of a data-flow analysis, dependence analysis, alias analysis, pointer analysis, escape analysis, and the like thereof. In an embodiment, and without limitation, signal transformation component 908 may optimize intermediate representation 912 as a function of one or more inline expansions, dead code eliminations, constant propagation, loop transformations, and/or automatic parallelization functions. In another embodiment, signal transformation component 908 may optimize intermediate representation as a function of a machine dependent optimization such as a peephole optimization, wherein a peephole optimization may rewrite short sequences of code into more efficient sequences of code. Signal transformation component 908 may optimize intermediate representation to generate an output language, wherein an "output language," as used herein, is the native machine language of flight controller 904. For example, and without limitation, native machine language may include one or more binary and/or numerical languages.

In an embodiment, and without limitation, signal transformation component 908 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field/with q elements; strings so encoded have a minimum hamming distance of k+1, and permit correction of $(q-k-1)/2$ erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 9, flight controller 904 may include a reconfigurable hardware platform 916. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 916 may be reconfigured to enact any algorithm and/or algorithm selection process received from another computing device and/or created using machine-learning processes.

Still referring to FIG. 9, reconfigurable hardware platform 916 may include a logic component 920. As used in this disclosure a "logic component" is a component that executes instructions on output language. For example, and without limitation, logic component may perform basic arithmetic, logic, controlling, input/output operations, and the like thereof. Logic component 920 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 920 may be organized according to Von Neumann and/or Harvard architecture as a non-limiting example. Logic component 920 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 920 may include one or more integrated circuit microprocessors, which may contain one or more central processing units, central processors, and/or main processors, on a single metal-oxidesemiconductor chip. Logic component 920 may be configured to execute a sequence of stored instructions to be performed on the output language and/or intermediate representation 912. Logic component 920 may be configured to fetch and/or retrieve the instruction from a memory cache, wherein a "memory cache," as used in this disclosure, is a stored instruction set on flight controller 904. Logic component 920 may be configured to decode the instruction retrieved from the memory cache to opcodes and/or operands. Logic component 920 may be configured to execute the instruction on intermediate representation 912 and/or output language. For example, and without limitation, logic component 920 may be configured to execute an addition operation on intermediate representation 912 and/or output language.

In an embodiment, and without limitation, logic component 920 may be configured to calculate a flight element 924. As used in this disclosure a "flight element" is an element of datum denoting a relative status of aircraft. For example, and without limitation, flight element 924 may denote one or more torques, thrusts, airspeed velocities, forces, altitudes, groundspeed velocities, directions during flight, directions facing, forces, orientations, and the like thereof. For example, and without limitation, flight element 924 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 924 may denote that aircraft is following a flight path accurately and/or sufficiently.

Still referring to FIG. 9, flight controller 904 may include a chipset component 928. As used in this disclosure a "chipset component" is a component that manages data flow. In an embodiment, and without limitation, chipset component 928 may include a northbridge data flow path, wherein the northbridge dataflow path may manage data flow from logic component 920 to a high-speed device and/or component, such as a RAM, graphics controller, and the like thereof. In another embodiment, and without limitation, chipset component 928 may include a southbridge data flow path, wherein the southbridge dataflow path may manage data flow from logic component 920 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 928 may manage data flow between logic component 920, memory cache, and a flight component 932. As used in this disclosure a "flight component" is a portion of an aircraft that can be moved or adjusted to affect one or more flight elements. For example, flight component 1432 may include a component used to affect the aircrafts' roll and pitch which may comprise one or more ailerons. As a further example, flight component 932 may include a rudder to control yaw of an aircraft. In an embodiment, chipset component 928 may be configured to communicate with a plurality of flight components as a function of flight element 924. For example, and without limitation, chipset component 928 may transmit to an aircraft rotor to reduce torque of a first lift propulsor and increase the forward thrust produced by a pusher component to perform a flight maneuver.

In an embodiment, and still referring to FIG. 9, flight controller 904 may be configured generate an autonomous function. As used in this disclosure an "autonomous function" is a mode and/or function of flight controller 904 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 924. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 904 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 904 will control the ailerons and/or rudders. As used in this disclosure "non-autonomous mode" is a mode that denotes a pilot will control aircraft and/or maneuvers of aircraft in its entirety.

In an embodiment, and still referring to FIG. 9, flight controller 904 may generate autonomous function as a function of an autonomous machine-learning model. As used in this disclosure an "autonomous machine-learning model" is a machine-learning model to produce an autonomous function output given flight element 924 and a pilot signal 936 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 936 may denote that a pilot is controlling and/or maneuvering ailerons, wherein the pilot is not in control of the rudders and/or propulsors. In an embodiment, pilot signal 936 may include an implicit signal and/or an explicit signal. For example, and without limitation, pilot signal 936 may include an explicit signal, wherein the pilot explicitly states there is a lack of control and/or desire for autonomous function. As a further non-limiting example, pilot signal 936 may include an explicit signal directing flight controller 904 to control and/or maintain a portion of aircraft, a portion of the flight plan, the entire aircraft, and/or the entire flight plan. As a further non-limiting example, pilot signal 936 may include an implicit signal, wherein flight controller 904 detects a lack of control such as by a malfunction, torque alteration, flight path deviation, and the like thereof. In an embodiment, and without limitation, pilot signal 936 may include one or more explicit signals to reduce torque, and/or one or more implicit signals that torque may be reduced due to reduction of airspeed velocity. In an embodiment, and without limitation, pilot signal 936 may include one or more local and/or global signals. For example, and without limitation, pilot signal 936 may include a local signal that is transmitted by a pilot and/or crew member. As a further non-limiting example, pilot signal 936 may include a global signal that is transmitted by air traffic control and/or one or more remote users that are in communication with the pilot of aircraft. In an embodiment, pilot signal 936 may be received as a function of a tri-state bus and/or multiplexor that denotes an explicit pilot signal should be transmitted prior to any implicit or global pilot signal.

Still referring to FIG. 9, autonomous machine-learning model may include one or more autonomous machine-learning processes such as supervised, unsupervised, or reinforcement machine-learning processes that flight controller 904 and/or a remote device may or may not use in the generation of autonomous function. As used in this disclosure "remote device" is an external device to flight controller 904. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 9, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 904 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 9, flight controller 904 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 904. Remote device and/or FPGA may transmit a signal, bit, datum, or parameter to flight controller 904 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 904 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 9, flight controller 904 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 9, flight controller 904 may include, but is not limited to, for example, a cluster of flight controllers in a first location and a second flight controller or cluster of flight controllers in a second location. Flight controller 904 may include one or more flight controllers dedicated to data storage, security, distribution of traffic for load balancing, and the like. Flight controller 904 may be configured to distribute one or more computing tasks as described below across a plurality of flight controllers, which may operate in parallel, in series, redundantly, or in any other manner used for distribution of tasks or memory between computing devices. For example, and without limitation, flight controller 904 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 9, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 932. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 9, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 904. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 912 and/or output language from logic component 920, wherein output language may include one or more analog-to-digital conversions, low bit rate transmissions, message encryptions, digital signals, binary signals, logic signals, analog signals, and the like thereof described above in detail.

Still referring to FIG. 9, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 9, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 9, flight controller 904 may also be implemented using a "shared nothing" architecture in which data is cached at the worker, in an embodiment, this may enable scalability of aircraft and/or computing device. Flight controller 904 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 9, flight controller may include a sub-controller 940. As used in this disclosure a "sub-controller" is a controller and/or component that is part of a distributed controller as described above; for instance, flight controller 904 may be and/or include a distributed flight controller made up of one or more sub-controllers. For example, and without limitation, sub-controller 940 may include any controllers and/or components thereof that are similar to distributed flight controller and/or flight controller as described above. Sub-controller 940 may include any component of any flight controller as described above. Sub-controller 940 may be implemented in any manner suitable for implementation of a flight controller as described above. As a further non-limiting example, sub-controller 940 may include one or more processors, logic components and/or computing devices capable of receiving, processing, and/or transmitting data across the distributed flight controller as described above. As a further non-limiting example, sub-controller 940 may include a controller that receives a signal from a first flight controller and/or first distributed flight controller component and transmits the signal to a plurality of additional sub-controllers and/or flight components.

Still referring to FIG. 9, flight controller may include a co-controller 944. As used in this disclosure a "co-controller" is a controller and/or component that joins flight controller 904 as components and/or nodes of a distributer flight controller as described above. For example, and without limitation, co-controller 944 may include one or more controllers and/or components that are similar to flight controller 904. As a further non-limiting example, co-controller 944 may include any controller and/or component that joins flight controller 904 to distributer flight controller. As a further non-limiting example, co-controller 944 may include one or more processors, logic components and/or computing devices capable of receiving, processing, and/or transmitting data to and/or from flight controller 904 to distributed flight control system. Co-controller 944 may include any component of any flight controller as described above. Co-controller 944 may be implemented in any manner suitable for implementation of a flight controller as described above.

In an embodiment, and with continued reference to FIG. 9, flight controller 904 may be designed and/or configured to perform any method, method step, or sequence of method steps in any embodiment described in this disclosure, in any order and with any degree of repetition. For instance, flight controller 904 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 10:
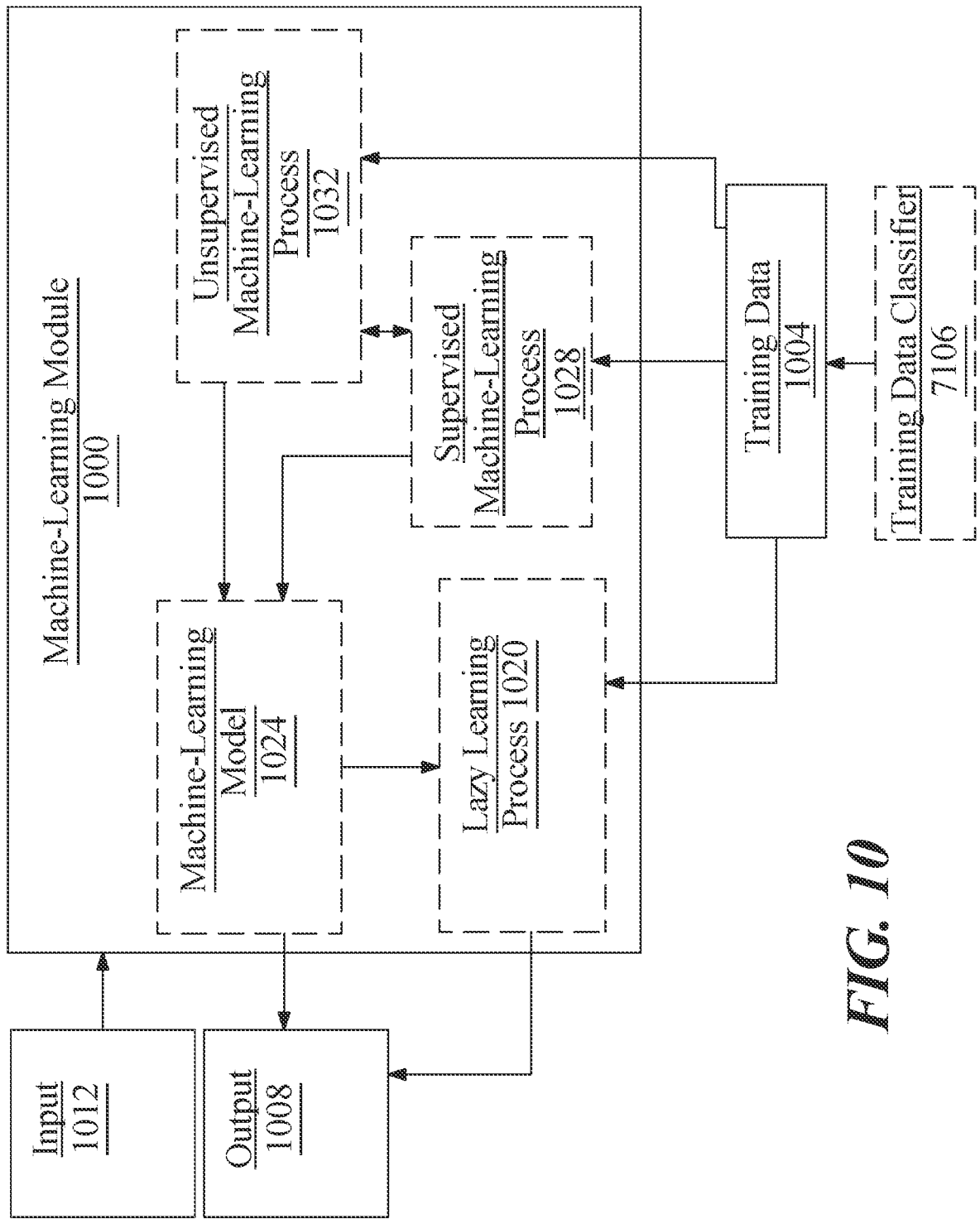
FIG. 10 is a block diagram of an exemplary machine-learning process in accordance with one or more aspects of the present disclosure.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example flight elements and/or pilot signals may be inputs, wherein an output may be an autonomous function.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to sub-categories of flight elements such as torques, forces, thrusts, directions, and the like thereof.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
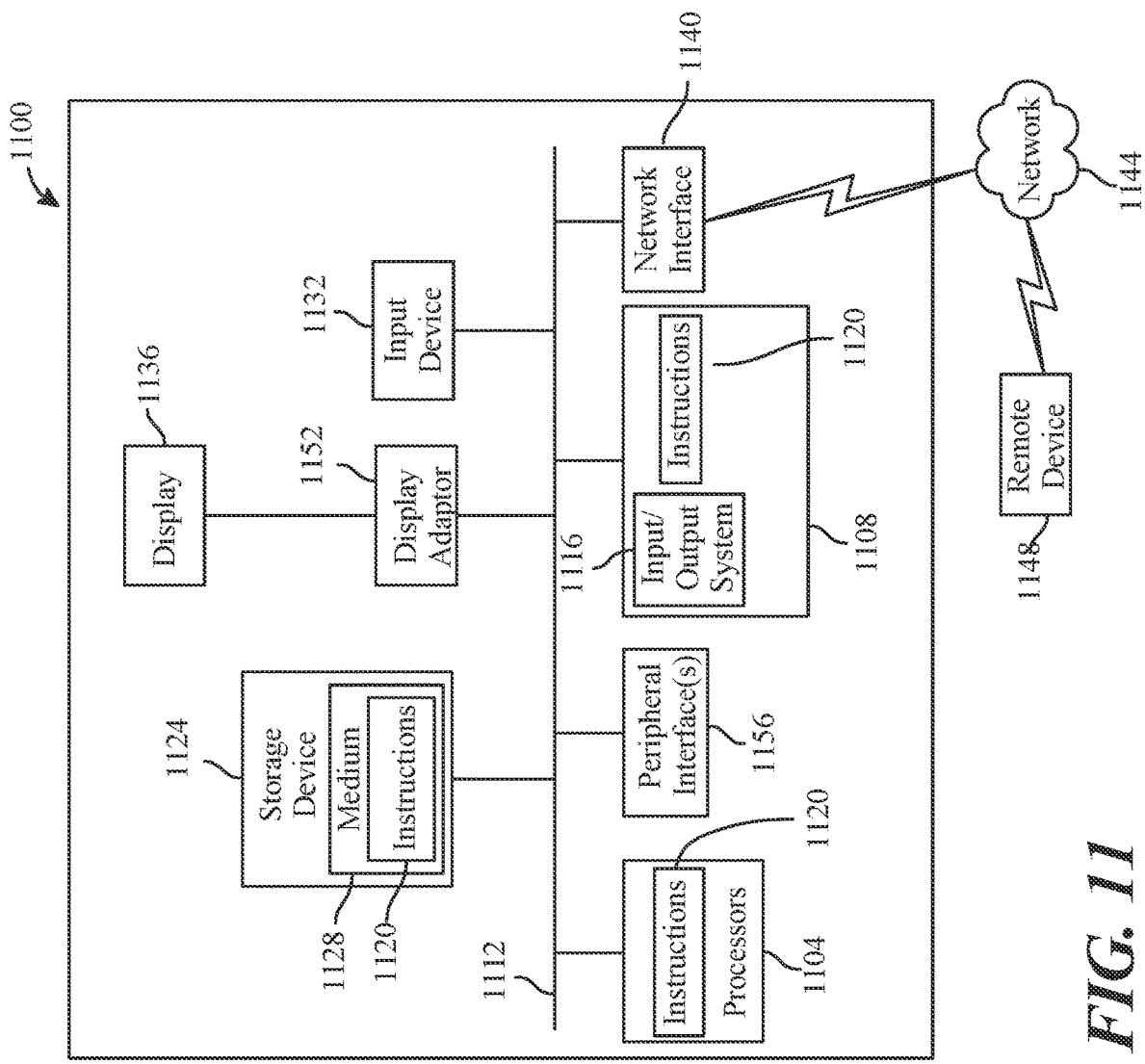
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIRE-WIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for bidirectional charging, the system comprising:
    an electric vehicle, the electric vehicle including a power source for supplying energy to the electric vehicle, wherein a portion of the energy of the power source comprises a reserve energy that is reserved for an emergency situation of the electric vehicle and wherein the power source is configured to charge using energy from a power grid connected with the electrical vehicle via a charging connection connected to a charging station;
    at least one controller communicatively connected to the electric vehicle; and
    at least one sensor communicatively connected to the at least one controller and the power source, wherein the at least one sensor is configured to detect power data associated with a discharge of the energy source, wherein the at least one controller is configured to:
        initiate a discharge of the power source using the charging station in electric communication with the electric vehicle via the charging connection, wherein the discharge is based on the power data from the at least one sensor and includes a depth of discharge of the power source based on a predetermined maximum discharge level corresponding to the reserve energy,
    wherein the predetermined maximum discharge level includes a range of 80% to 95% depth of discharge of the power source.

2. The system of claim 1, wherein the power data comprises a current of the charging connection.

3. The system of claim 1, wherein the power data comprises a discharge metric.

4. The system of claim 3, wherein the discharge metric includes one or more of a state of charge of the power source or temperature of the power source.

5. The system of claim 4, wherein the at least one sensor is configured to detect the state of charge of the power source.

6. The system of claim 1, wherein the at least one sensor includes a voltmeter communicatively connected to the power source, wherein the voltmeter is configured to detect the power data, wherein the power data comprises a voltage of the power source.

7. The system of claim 3, wherein the power source comprises a battery management component attached to the power source, wherein the battery management component is configured to monitor and regulate a temperature of the power source as a function of the discharge metric.

8. The system of claim 1, wherein the electric vehicle further comprises a port that is configured to removably attach to a connector to create the charging connection.

9. The system of claim 1, wherein the at least one controller is further configured to initiate the discharge of the power source via a control signal to the charging station.

10. The system of claim 1, wherein the at least one sensor includes an electrical sensor communicatively connected to the charging connection and configured to detect a current of the charging connection.

11. A method comprising:
    coupling an electric vehicle to a charging station to create a charging connection between a power source of the electric vehicle and the charging station, the power source supplying energy to the electric vehicle, wherein a portion of the energy of the power source comprises a reserve energy that is reserved for an emergency situation of the electric vehicle;

detecting power data associated with a discharge of the power source using at least one sensor; and discharging the power source via the charging connection, such that a depth of discharge of the power source is based on the power data and includes a predetermined maximum discharge level corresponding to the reserve energy, wherein the predetermined maximum discharge level includes a range of 80% to 95% depth of discharge of the power source.

12. The method of claim 11, wherein the power data comprises a discharge metric that comprises a state of charge of the power source.

13. The method of claim 12, further comprising detecting the state of charge of the power source using a sensor communicatively connected to the power source.

14. The method of claim 11, wherein the power source comprises a battery management component attached to the power source, wherein the battery management component is configured to monitor and regulate a temperature of the power source as a function of the power data.

15. The system of claim 1, wherein the power data includes measurement data associated with electric characteristics of the power source when a state of charge (SOC) of the power source is below a minimum state of charge.

16. The system of claim 1, wherein the at least one controller is further configured to determine an energy demand forecast of the electric vehicle based on the power data.

17. A system for bidirectional charging, the system comprising:

an electric vertical takeoff and landing (eVTOL) aircraft, the electric eVTOL including a power source for supplying energy to the eVTOL, wherein a portion of the energy of the power source comprises a reserve energy that is reserved for an emergency situation of the eVTOL and wherein the power source is configured to charge using energy from a power grid connected with the eVTOL via a charging connection connected to a charging station;

at least one controller communicatively connected to the eVTOL; and at least one sensor communicatively connected to the at least one controller and the power source, wherein the at least one sensor is configured to detect power data associated with a discharge of the energy source, wherein the at least one controller is configured to:

initiate the discharge of the power source using the charging station in electric communication with the eVTOL via the charging connection, wherein the discharge is based on the power data from the at least one sensor and includes a depth of discharge of the power source based on a predetermined maximum discharge level corresponding to the reserve energy, wherein the predetermined maximum discharge level includes a range of 80% to 95% depth of discharge of the power source.

18. The system of claim 17, wherein the power data comprises a discharge metric.

19. The system of claim 18, wherein the discharge metric includes one or more of a state of charge of the power source or temperature of the power source.

20. The system of claim 19, wherein the at least one sensor is configured to detect the state of charge of the power source.

* * * * *